US009704172B2

(12) United States Patent
Murray

(10) Patent No.: US 9,704,172 B2
(45) Date of Patent: Jul. 11, 2017

(54) SYSTEMS AND METHODS OF SIMULATING USER INTUITION OF BUSINESS RELATIONSHIPS USING BIOGRAPHICAL IMAGERY

(71) Applicant: E-Valuation, Inc., Garden City, NY (US)

(72) Inventor: Brian J. Murray, Garden City, NY (US)

(73) Assignee: E-valuation, Inc., Garden City, NY (US)

( * ) Notice: Subject to any disclaimer, the term of this patent is extended or adjusted under 35 U.S.C. 154(b) by 0 days.

(21) Appl. No.: 14/932,336

(22) Filed: Nov. 4, 2015

(65) Prior Publication Data
US 2016/0055504 A1    Feb. 25, 2016

Related U.S. Application Data

(63) Continuation of application No. PCT/US2014/050447, filed on Aug. 8, 2014.
(Continued)

(51) Int. Cl.
*G06Q 30/02* (2012.01)
*G06Q 40/00* (2012.01)
(Continued)

(52) U.S. Cl.
CPC ....... *G06Q 30/0205* (2013.01); *G06F 3/0482* (2013.01); *G06F 3/04817* (2013.01);
(Continued)

(58) Field of Classification Search
CPC ............... G06Q 30/0205; G06Q 40/12; G06F 17/30368; G06F 17/30377;
(Continued)

(56) References Cited

U.S. PATENT DOCUMENTS

| 5,548,699 A | 8/1996 | Ishida et al. |
| 7,016,828 B1 * | 3/2006 | Coyne ............... G06F 17/212 |
| | | 704/9 |

(Continued)

OTHER PUBLICATIONS

Business Editors/High, T. W. (May 6, 1999). Visual insights ADVIZOR transforms customer relationship management-CRM-analysis with interactive data visualization. Business Wire.*
(Continued)

*Primary Examiner* — Nga B Nguyen
*Assistant Examiner* — Alissa Karmis
(74) *Attorney, Agent, or Firm* — Carter, DeLuca, Farrell & Schmidt, LLP

(57) ABSTRACT

The systems and methods of the present disclosure simulate the intuitive visualization of a host organization's experienced personnel by graphically portraying business relationships with external and internal business entities including clients, vendors, prospects, service resources, agents, and company personnel in universally recognizable caricatured scenes and images, including animations, based on transactional events that are passively accumulated from the accounting, phone, email, and management operations of a host system, delivering objectively-based graphical renditions of business relationships reflecting tenure, volume, frequency, demeanor, profitability, reliability, and many other relationship attributes thus enabling new, learning disabled, or unfamiliar personnel who possess varying degrees of first-person experience with the subject entities to respond instinctively and accurately to the current occurrence with the subject business entity while preserving invaluable relationship intuition that is otherwise lost when veteran personnel are absent or removed from their position or that takes new personnel weeks, months, or years to acquire.

24 Claims, 20 Drawing Sheets

Related U.S. Application Data

(60) Provisional application No. 61/863,772, filed on Aug. 8, 2013.

(51) Int. Cl.
    *H04M 3/54*     (2006.01)
    *G06F 3/0482*   (2013.01)
    *G06T 13/80*    (2011.01)
    *G06F 17/30*    (2006.01)
    *G06F 3/0481*   (2013.01)

(52) U.S. Cl.
    CPC .. *G06F 17/30368* (2013.01); *G06F 17/30377* (2013.01); *G06F 17/30604* (2013.01); *G06Q 40/12* (2013.12); *G06T 13/80* (2013.01); *H04M 3/54* (2013.01)

(58) Field of Classification Search
    CPC ........... G06F 17/30604; G06F 3/04817; G06F 3/0482; G06T 13/80; H04M 3/54
    USPC ................................................ 705/7.34, 7.33
    See application file for complete search history.

(56) References Cited

U.S. PATENT DOCUMENTS

| | | |
|---|---|---|
| 7,380,217 B2 | 5/2008 | Gvelesiani |
| 8,417,568 B2 | 4/2013 | Nong et al. |
| 2002/0069101 A1* | 6/2002 | Vincent .................. G06Q 30/02 705/14.53 |
| 2002/0087385 A1* | 7/2002 | Vincent .................. G06Q 10/10 705/7.29 |
| 2004/0107190 A1 | 6/2004 | Gilmour et al. |
| 2004/0243454 A1 | 12/2004 | Yoshida |
| 2005/0004813 A1 | 1/2005 | Gvelesiani |
| 2005/0289474 A1 | 12/2005 | Master et al. |
| 2006/0235809 A1* | 10/2006 | Pearson .................. G06Q 99/00 705/500 |
| 2007/0147654 A1* | 6/2007 | Clatworthy ......... G06F 17/2735 382/100 |
| 2007/0192164 A1 | 8/2007 | Nong et al. |
| 2008/0154928 A1 | 6/2008 | Bashyam et al. |
| 2008/0189240 A1 | 8/2008 | Mullins et al. |
| 2008/0270458 A1* | 10/2008 | Gvelesiani ........ G06F 17/30572 |
| 2009/0066712 A1* | 3/2009 | Gilger .................... G06Q 10/00 345/581 |
| 2010/0325076 A1* | 12/2010 | Paulk ....................... G06N 5/02 706/47 |
| 2011/0213859 A1 | 9/2011 | Greene et al. |
| 2011/0286584 A1 | 11/2011 | Angel et al. |
| 2012/0084667 A1 | 4/2012 | Hickman |
| 2012/0137367 A1 | 5/2012 | Dupont et al. |
| 2012/0224681 A1* | 9/2012 | Desai .................. H04M 3/5166 379/266.1 |
| 2012/0233089 A1 | 9/2012 | Calman et al. |
| 2012/0303395 A1 | 11/2012 | Saxena et al. |
| 2012/0310773 A1 | 12/2012 | Masuko et al. |
| 2012/0311462 A1 | 12/2012 | Devecka |
| 2013/0031126 A1* | 1/2013 | Setlur ............... G06F 17/30554 707/769 |
| 2015/0051950 A1* | 2/2015 | Cox ....................... G06Q 50/12 705/7.31 |

OTHER PUBLICATIONS

International Search Report issued in corresponding application No. PCT/US14/50447 on Jun. 3, 2015.

* cited by examiner

SYSTEMS AND METHODS OF SIMULATING USER INTUITION OF BUSINESS RELATIONSHIPS USING BIOGRAPHICAL IMAGERY

BACKGROUND

Technical Field

The present disclosure generally relates to systems and methods of preserving a host organization's intuitive knowledge base by capturing and transforming transactional information into biographical imagery depicting entity-to-company relationships. In particular, the systems and methods of the present disclosure graphically portray business and other relationships in universally recognizable images or moving images based on transactions that are passively accumulated from the service, accounting, phone, email, and interactive operations of a host entity.

Background of Related Art

Many industries have developed software applications to help them understand their clients and respond most effectively to their client needs as their client relationships evolve (e.g., the client becomes more or less profitable or the client expands the range of services that it can provide). In the financial industry, some software applications exist that gather and aggregate client data and present it in some form of chart or graph that helps personnel understand the financial positions of the clients and to respond appropriately to requests from them.

Despite the ubiquitous use of computer graphics by gamers, advertisers, educators, and the arts, little has been advanced in graphical representation of business relationships using real time operational data from production Management Information Systems (MIS). Although the 'dashboard' concept has been pursued at the executive level for consolidating or summarizing top tier or mission-critical information, a need exists at the lower levels of an organization for faster, more intuitive data communication, especially for the users who are predisposed to graphic speed and visual content.

In the early 1980s, following Xerox's SmallTalk and later IBM's Visual Age among others, a few companies pioneered a graphics-based programming environment whose direction was to utilize graphic icons for programming its computer systems and to advance its research into Human-Computer Symbiosis (HCS). Perhaps due to competing demands for other, less venturesome products or for being too far ahead of its graphics-oriented constituency to be economically viable, those early commercial ventures languished in the late 1990s.

While a broad array of tools sets for graphics development evolved in parallel with those early expeditions, little has been advanced in graphical languages for business information so much as for gaming, advertising, education, and more vanguard consumer industries. Worldwide, the military has long employed the use of uniform insignia to communicate rank and experience, enabling personnel at the ground level to instantly and innately identify each other's capacity, maintaining intuitive structure amidst dynamic personnel shifts. Notably, the U.S. military has recently begun issuing pictorial pamphlets designed jointly by linguists, graphic designers, military consultants, and technology engineers to visually communicate policy and procedures Chow to spot terrorists', 'what to do in the event of a vehicle crash', etc.) in Afghanistan where non-verbal dialog is key in a country with multiple languages and dialects. By pointing to pictures, the American soldiers with no knowledge of Pashto can communicate with Afghan men.

Within the last two decades, system platforms have evolved to near infinite storage capacity, ubiquitous connectivity, and everyman affordability, inviting graphical, intuitive communication at all levels of global society. At the core of all organizations, whether for clients, customers, students, patients, subscribers, members, staff, resources, prospects, or any other entity-to-entity engagement, business or otherwise, is the ability to recognize, comprehend, and maintain interpersonal relationships.

SUMMARY

Through the combination of common computer technologies involving internet integration, database methods, computer graphics, and telephone call messaging, the systems and methods of the present disclosure invoke innate human responsiveness to graphical stimuli. Specifically, the present disclosure provides a generic facility for the capture, preservation, and presentation of event-based relationships. In one aspect, the present disclosure features a method of communicating a target entity's complex relationship with a host entity using biographical imagery. The method includes receiving an inquiry message at a biographical imagery server 201 from a host system associated with the host entity requesting a profile of the 'target' entity (also referred to as a subject entity), assembling attributes corresponding to aggregated information regarding events in response to receiving the inquiry message, selecting images associated with the attributes from amongst an inventory of images, generating a composite image of multiple layers of images from the selected images, and displaying the composite image.

Utilizing a separate display monitor adjacent to the user's production MIS workstation or, alternatively, in a separate window on the user's desktop, the systems and methods of the present disclosure detects the host system's contact with a specific entity and displays a comprehensive biographical imagery profile of that entity on the tandem screen, alerting the user to all of the normal and abnormal attributes of that entity, providing a precise, statistically accurate portrayal of that entity's total relationship with the company. Without requiring separate action by the user, this automatic display function gives the user a view beyond the details of the current event into the longer term aspects and values of the relationship including tenure, volume, profitability, anniversaries, deadlines, personal hobbies, and other positive, or negative, factors that combine into the overall relationship.

When phone calls are received from, or made to, clients, customers, patients, or other types of 'hosted entities', the application of the present disclosure receives a call initiation message and instantly displays a comprehensive graphical profile of the 'target' entity along with the essential profiles of the most active contacts within the host organization. Without any action on the part of the user, this passive process immediately equips them with an understanding of those in their organization with whom the calling party usually corresponds and who, alternatively, can respond to that party. By passively capturing phone call statistics that are commonly available from contemporary phone systems, the biographical imagery server 201 application adds a substantial dimension to its client relationship database, displaying which people most often contact which other people and for what specific purposes. The immediate profiling of the called and calling parties substantially reduces the amount of time it takes for support or service representatives to understand the data presented to them, increasing service and support personnel payload and availability to accurately handle more calls.

When assigning a specific task or service to be rendered to a hosted entity, the user can 'survey' the most experienced resources, whether inside or outside the company, who provide such resources for that entity. Where no history of such contacts exists for that hosted entity, an array of popular contacts at the next level of the entity's engagement (region, area, community, etc.) may be offered in the display profiles. The scaled graphics and statistically accurate renditions of vendors and other resources allow even novices to make informed assessments.

The present disclosure affords the host system administrator minimal integration effort to passively export 'events' from their accounting, services, and phone system. Event 'messages' are composed in native code format typically at the general ledger or subsidiary ledger update point. Operating as cloud based internet or intranet server, the Software-As-Service based application asserts minimal overhead on the host system.

The present disclosure seizes on the convergence of that expansive mechanical capacity, the merging of international cultures, and the current generation's propensity for fast, concise communication using an imagery-based language that all cultures can immediately comprehend.

The present disclosure features a method of capturing an intuitive knowledge base of a host entity's relationships to its subject entities. The method includes capturing multiple transactional events that, collectively, define the relationship of the host entity to its subject entities. In aspects, the transactional events are received from one or more system sources of the host entity. The method also includes imbedding function calls at transactional points in applications of a host computer system of the host entity, activating a messaging services function in host communications systems of the host entity, and receiving formatted messages from (1) the imbedded function calls in the host system of the host entity for each transactional event and (2) the host communications systems for each incoming and outgoing communication. The method also includes interpreting the formatted messages as either transactional event data or inquiry messages, validating the interpreted messages against an anticipated host entity account database, recording the interpreted messages in memory as event-based transactions, and aggregating at least one attribute of each of the transactional events to obtain multiple transactions.

In aspects, the host communications system is a phone system and receiving the formatted messages includes receiving phone messages passively transmitted from the phone system. In aspects, the method also includes rendering a graphical profile of subject entities identified in the phone messages and selecting event codes defining phone call direction based on information in the received phone messages. In aspects, the received phone messages may be conformed to the server's standard phone system event messages. The method also includes validating account codes provided in the received phone messages against account codes in an event code map, recording a phone system event identification code provided in the received phone messages, receiving incoming or outgoing phone call start messages containing the phone number with extension number, if any, of both initiating and receiving entities, receiving an inquiry message from the phone system for the display of respective subject entity graphical profiles in response to the incoming or outgoing phone call start messages, rendering the graphical profiles of the subject entities and/or host contacts, and displaying a user interface including action icons to record a disposition of a complete phone call.

In aspects, the method may include assembling incoming, outgoing, and total phone call statistics of the host entity and the subject entity. In aspects, the method may include recording and matching corresponding beginning and ending phone call messages from the phone system to record a single event combining call starting, ending, and duration factors.

In aspects, the method includes validating the existence of active subject entities using an entity master table in a biographical imagery server for phone call initiating parties and/or receiving parties identified by internal and/or external phone call information. In aspects, the method may include creating temporary subject entity master tables in the entity master table for calls, e.g., completed calls, containing an unidentified subject entity based on phone numbers that do not match phone numbers in the entity master table. The method may include recording unidentifiable phone events in an unidentified phone message table for completed phone calls containing unidentified subject entities pending assignment of a valid entity master to the unidentified subject entity by the host system, notifying the host computer system of the unidentified phone messages, receiving and recognizing an assignment phone entity message assigning a valid entity master to an unidentified calling party, posting a corrected phone event message into a primary event processing channel of the server defining both the initiating and receiving entities, updating the unidentified phone message table and entity master table upon posting of a completed phone event message.

In aspects, the method may include tracking phone calls between initiating and receiving entities by using entity rank and sequence identifiers within a primary entity master code table. In aspects, the method may include associating a proxy phone identification of a subordinate entity to their superior entity's phone identification information to allow for proxy events.

In aspects, the formatted messages received from the imbedded function calls in the host computer system include event information relating to the subject entity that includes dollar, quantity, and/or instance counts of accounting and/or operational transactions processed in the host computer system.

In aspects, the method may include validating host activity account codes of the received host system messages against account codes in an event code map. In further aspects, the method may include recording unidentifiable host activity account messages in a host activity account message reject table for host system messages containing unidentified host activity accounts, notifying the host system of the unidentified host activity account messages, receiving and recognizing a host activity account repair message assigning a valid host activity account to an unidentified host activity account message, updating the unidentified host activity account message in a host activity account message reject table, and processing an updated host activity account message as a new message.

In aspects, the method may also include validating the existence of active subject entities using a host entity account number and an subject entity master table stored on the biographical imagery system, creating temporary subject entity master records in the subject entity master table for an unidentified subject entity based on unmatched host entity account numbers against the subject entity master table, recording unidentifiable host entity account messages in a host entity account message reject table for host system messages containing unidentified host entity accounts pending assignment of a valid host entity account to the unidentified host entity account message by the host system, notifying the host system of the unidentified host entity account messages, receiving and recognizing a host entity account repair message assigning a valid host entity account to an unidentified host entity account message, updating the unidentified host entity account message in the subject entity master table, inactivating the temporary subject entity master in the subject entity master table, receiving event information for textual display, and aggregating event information regarding events by recording a transaction for at least one attribute of each of the events to obtain a plurality of transactions.

In aspects, the method may also include displaying a user interface including action icons to record an exception occurrence or condition regarding the subject entity, where each of the action icons are associated with an exception disposition and with a defined event code. The method may also include generating an event message in response to user selection of an action icon, displaying an array of attributes associated with the exception occurrence or condition regarding the subject entity, and providing a user control in the user interface for selecting an exception disposition in one or more successive image menus.

In aspects, the method may include recording a unique event identification code input via the user interface, providing a user control in the user interface for scaling the selected action icon to indicate the degree of the exception occurrence or condition, generating an event message in response to user selection of a specific action icon, and invoking a refresh inquiry so that the selected user exception is displayed on the entity profile but without recording an additional inquiry transaction.

In aspects, the host communications system is a phone system and the formatted messages include an inquiry formatted event message, which includes host account and/or phone identification information and which is received from the host system or phone system. The method may also include reading the host system's account identification code or phone identification code for the subject entity included in the inquiry formatted event message, searching an entity master database for the account identification code or the phone identification code, prompting a user to generate a new temporary entity if the account identification code or phone identification code is not found in the search of the entity master database, and generating a new entity record if the account identification code or the phone identification code is not found in the search of the entity master database.

In aspects, the method may include displaying, on a user's display screen, a user interface allowing a user to enter exceptional conditions related to a found or generated entity, and recording the exceptional conditions related to the found or generated entity. In aspects, the method may include identifying secondary entities within a primary host entity, and specifying primary or secondary entity names and target organization ranks. In aspects, the method may also include generating an event to record the completed execution of an inquiry of the found entity.

In aspects, the method may also include aggregating event information regarding the plurality of events by recording a transaction for at least one attribute of each of the plurality of events to obtain a plurality of transactions, validating a host account in the aggregated event information against a plurality of accounts in an event code map to obtain an event code, determining whether a subject entity in the aggregated event information is found among a plurality of entities in an entity master database, adding the entity to the entity master database if the entity is not found among the plurality of entities using native entity identification information and entity identification information stored in memory of the host system. In aspects, the method may further include recording changes to the entity identification information in the entity master database, and transmitting an acknowledgement message to the host system that the entity has been recognized or temporarily created in the event of an unrecognized entity, and that an event was successfully recorded by a biographical imagery server in its memory.

In aspects, the method may further include aggregating event information regarding the plurality of events by recording a transaction for at least one attribute of each of the plurality of events to obtain a plurality of transactions, determining a plurality of event codes for native activity and/or account codes defined in the event information, searching an event master table for at least one attribute associated with each of the plurality of event codes, generating at least one transaction record based on at least one attribute associated with each of the plurality of event codes, attaching properties of at least one attribute to the at least one transaction record, and recording at least one transaction in a transaction database. In aspects, the method may include updating a latest transaction date and time in an entity table control record, determining whether an assembly summary workfile of the subject entity is current, and recalculating the assembly summary workfile of the subject entity if it is determined that the assembly summary workfile is not current.

In aspects, the biographical imager server may: retain additional demographic data regarding the hierarchal placement of the entity as defined in the host system for referencing comparable entities within matching region, area, community, building, unit, and/or lease groups; provide special event message formats for the updating of primary entity master data including the specifying of a demographic location hierarchy of region, area, community, building, unit, and/or lease keys; provide special event message formats for the fulfillment of primary and secondary entity master data including the specifying of name and rank; provide special event message formats for the fulfillment of primary and secondary entity master data including phone contact information; retain phone contact information to subsequently associate phone record events for the new entity; and/or supply the host system with a message relating the presence of an unidentified phone contact to allow the host to identify the unidentified phone contact or to assign a new entity master for the unidentified phone contact.

In aspects, the method may include maintaining an inventory of a plurality of attributes in an attribute database to associate events with their representative images, supplying factors to permit passive adjustment of original attribute values to be incremented or decremented on a static or on a conditional basis, and modifying original transaction amounts for ageing, acceleration, deceleration, consolidation, and retention functionality. The attributes may include instance counting attributes and quantity value attributes so that incidence transactions may be distinguished from dollar or other quantity transactions.

In aspects, the method may include aggregating event information regarding the plurality of events by generating transaction records from the events, and aggregating the transaction records into a transactions database. Aggregating the transaction records may include copying point-in-time parameters from parent attribute master for ageing, deceleration, acceleration, consolidation, and/or retention of propagated transactions, tracking originating event messages and operators, and using a transaction master to represent consolidations of like-attribute based transaction histories.

In aspects, the method may include consolidating information regarding the plurality of transactions by establishing a current range of transaction dates to be consolidated based upon current attribute consolidation parameters, determining whether current transactions and previously consolidated transactions fall within the current range of transaction dates by calculating a current age of the current and previously consolidated transactions for each attribute type, ageing candidate transactions according to ageing parameters of the current attribute consolidation parameters, accelerating the candidate transactions based on acceleration parameters of the current attribute consolidation parameters, setting a current range of transaction dates to be purged based upon current attribute retention parameters, excluding transactions that have not reached the retention date based on retention parameters of the current attribute retention parameters, deleting or archiving each purged transaction for each of the attribute types based upon user archive and/or audit trail settings, and recording a new consolidated transaction for each of the attribute types.

The present disclosure also features a method of communicating an intuitive knowledge base of a host entity's relationship with a subject entity. The method includes receiving an inquiry message from an imbedded function call in a host system associated with the host entity requesting a graphical profile of the subject entity, assembling, in response to receiving the inquiry message, a plurality of attributes corresponding to a plurality of aggregated transactions that have been propagated from a plurality of events previously received from the host system, selecting a plurality of value-scaled images from image library arrays that have been composed to represent each attribute's range of visual representation, generating a composite image of a plurality of layers of images from a selected plurality of value-scaled images, and displaying the composite image on a user's display screen.

In aspects, the method may also include ageing accumulated transactions using user-defined ageing formulas to accelerate or decelerate the impact values of each transaction within their attribute class based on the time since the initial time of the transaction;

In aspects, the method may also include ordering the plurality of aggregated transactions of the subject entity by attribute code, determining a number of transactions for each attribute code, recording the oldest and newest transaction dates within an attribute range to a transaction workfile record of the respective attribute code, determining the age of each transaction, adjusting current count values or current quantity values for each transaction by count and weight factors, comparing a transaction date of each transaction to an ageing threshold, computing ageing factors based on flat amounts, a percentage of an original count value, or an original quantity value of the transaction, adding ageing factors to the original count value or the original quantity value for each transaction based on the comparison of the transaction date to the ageing threshold, accumulating the adjusted count or quantity values from current and consolidated transactions for each respective attribute code, averaging the accumulated count or quantity values of the plurality of aggregated transactions for each respective attribute code based on unit transaction counts from current and consolidated transactions, and recording the average accumulated count or quantity values to an assembly summary workfile record for each respective attribute code. In aspects, the method may include comparing the age of each transaction to a retention date and bypassing or removing transactions if the age of the transaction is earlier than the retention date. In aspects, the method may include comparing the transaction's date to an acceleration threshold and adding acceleration factors to the count value or the quantity value based on the comparison of the transaction date to the acceleration threshold.

In aspects, selecting the value-scaled images may include reading an image master object associated with the subject entity from an images database based on a total accumulated and adjusted summary total of each respective attribute code in a statistical workfile summary record, copying display positioning settings, e.g., layer and sector, for the selected image into the statistical workfile summary record for each respective attribute to provide for display sector priority, generating a composite image by layering images within specific sectors of an image plane according to hierarchical tier levels defined by the attribute code, determining top attributes in total weighted order within each tier of the image plane, ordering the top attributes in lightest to heaviest value within a range of sectors of the image plane per tier so that the image associated with a most dominant attribute is on topmost layers of the respective tier, scaling and contrast grading images in each of hierarchal layers based on specified width and height, and selecting respective layer images based on an aggregated attribute value falling within a high and low range of the image set.

In aspects, the method may include positioning the selected image based on vector or fixed background, midground, foreground, and fascia sector addresses within an image plane; associating background and foreground images that relate to types of services or products provided by the host entity to the subject entity; superimposing successive transparencies of foreground to background images relative to accumulated transactions of the subject entity according to a grading of the images, which characterizes the corresponding attributes; composing specific facial expressions from various attributes to properly reflect current transactional events based on vector location within a fascia tier; composing statistically derived rating scales depicting the entity's relationship to all or specific other entities or attribute classes; applying insignia to composite profiles of entities to reflect various rank, tenure, experience, and/or other common attributes, and applying shading and/or coloring to the images to intensify or dilute relationship factors.

In aspects, the method includes generating, at the host system, a transaction to record a completed execution of an inquiry event of the subject entity, updating a subject entity master with a latest transaction date, and transmitting exceptional conditions related to the subject entity to a biographical imagery system. The method may further include generating a transaction conformed to the subject entity recording the inquiry event.

In aspects, the method may further include displaying a user interface allowing a user to input exceptional conditions related to the subject entity. In aspects, the method may further include allowing the user to post a user exception disposition to an inquiry event and to prepare the subject entity for future access, and invoking a full assembly of the subject entity to create a display ready workfile to minimize processing lead time for forthcoming inquiries or event processing.

In aspects, the method may include requesting that the composite image be made available for audit validation, receiving a notification message indicating that a current image has been selected via a user interface, and in response to receiving a notification message to perform reverse assembly of the image: displaying attribute summary workfile records by attribute, displaying current and consolidated transactions reflected in each respective attribute assembly record for the selected image, and calculating and displaying original and weighted transaction values as subsequently aggregated to assembly summary workfile records of each attribute with weighing, ageing, and retention, based on the current processing date. In aspects, the method may include prompting a user in a display screen to select a portion of the graphical profile, e.g., a sector or layer, to be reverse assembled and displayed, displaying the selected portion of the profile in the display screen, e.g., in the foreground of the display screen, displaying the attribute summary workfile records by attribute for the selected portions of the graphical profile, displaying current and consolidated transactions reflected in each respective attribute assembly record for the selected portions of the profile, calculating and displaying original and weighted transaction values as subsequently aggregated to assembly summary workfile records of each attribute with weighing, ageing, and retention, based on the current processing date, and restoring the full graphical profile to the display screen at the completion of the reverse assembly display.

The present disclosure also features a system for capturing and communicating a subject entity's relationship with a host entity. The system includes a host server and a biographical imagery server. The host server includes an operations system and a plurality of displays associated with respective users of the host entity. The operations system detects and transmits event information regarding a plurality of events relating to the subject entity to the biographical imagery server, and generates event messages from embedded function calls placed at processing points in the operations system. Each of the plurality of displays is configured to display a composite image representing a profile of the subject entity.

The biographical imagery server is in communication with the host server and receives the event information, e.g., receives passively transmitted event messages, from the host server. The biographical imagery server includes a communications interface that receives an inquiry message from the host server requesting the profile of the subject entity, and a processor that assembles a plurality of attributes corresponding to aggregated information regarding events in response to receiving the inquiry message, selects images associated with the attributes from among an inventory of images, and generates a composite image of multiple layers of images from the selected images. The communications interface also transmits the composite image to a user's display screen.

In aspects, the operations system may be an accounting system, a phone system, an email system, a user interface, or any combination of these operations systems.

In aspects, the biographical imagery server may include an event code map database storing information regarding multiple host accounts, and a memory storing a subject entity master database including information regarding multiple subject entities, e.g., native target entity identification information and target entity identification information. The processor of the biographical imagery server may validate a host account in the event information against the plurality of host accounts to obtain an event code, determine whether the subject entity in the event information is found among a plurality of subject entities stored in the subject entity master database, add a subject entity to the subject entity master database if the subject entity is not found among the plurality of subject entities based on a search of the information regarding the subject entities, and record changes to the information regarding the plurality of subject entities in the subject entity master database. The information regarding the subject entity may include the native subject entity identification information and the subject entity identification information. The communications interface may transmit an acknowledgement message to the host server that the subject entity has been found or added to the subject entity master database, and that an event was successfully recorded by the biographical imagery server.

Certain embodiments of the present disclosure may include some, all, or none of the above advantages. Other technical advantages may be readily apparent to those skilled in the art from the figures, descriptions, and claims included in the present disclosure. Moreover, while specific advantages have been enumerated above, various embodiments may include all, some, or none of these advantages.

BRIEF DESCRIPTION OF THE DRAWINGS

Various embodiments of the present disclosure are described with reference to the accompanying drawings wherein.

DETAILED DESCRIPTION

Figure 1:
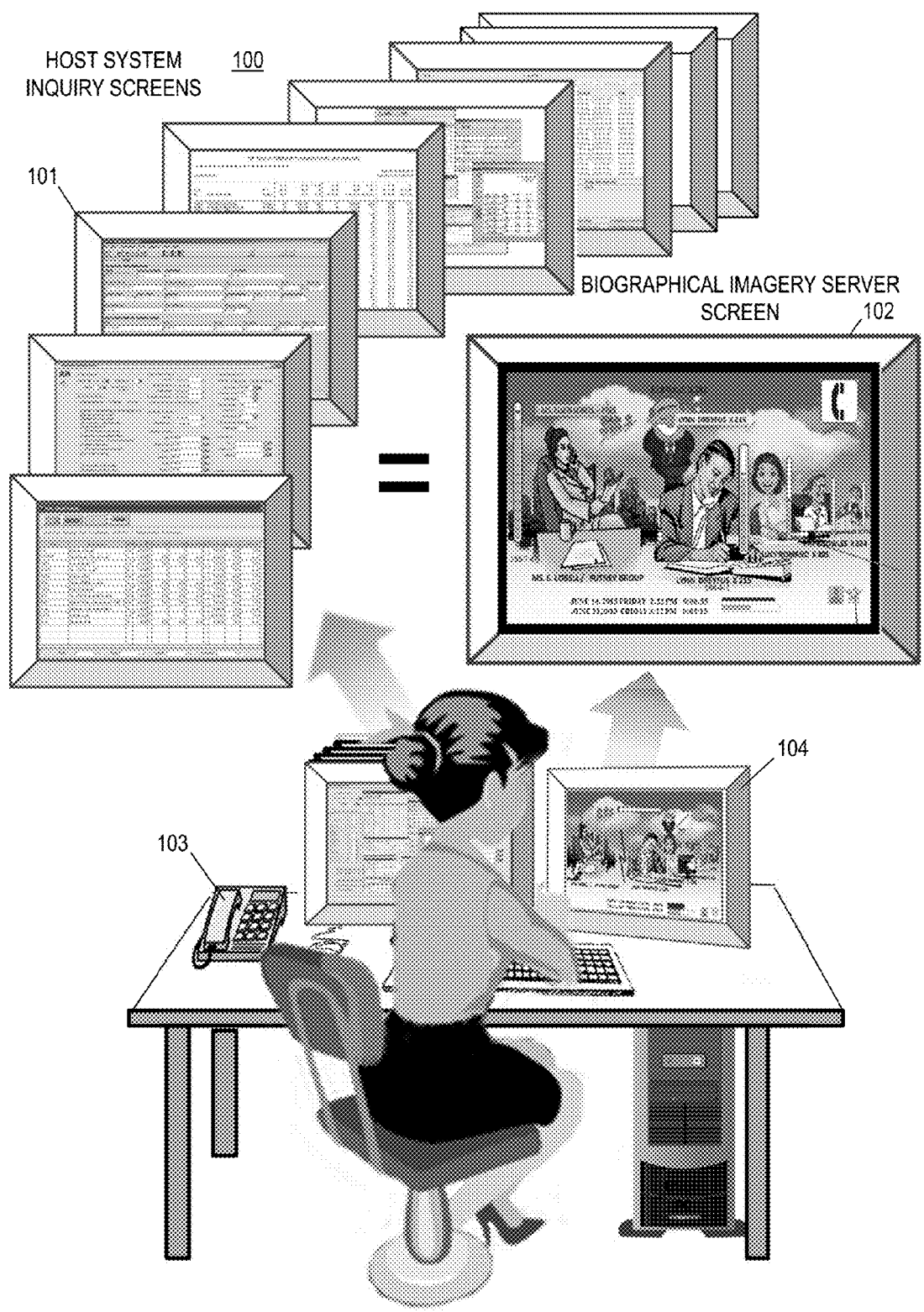
FIG. 1 is a perspective view of a system according to embodiments of the present disclosure and a portrayal of the user's desktop illustrating the concurrent display of host system applications with the tandem monitor display of the biographical imagery service application.

FIG. 1 illustrates a user desktop 100 that employs a biographical imagery server 201, which may also be referred to as the biographical server or the bio-server. The biographical imagery system or server 201 composes and deploys images interpreted from aggregated transactional data to depict the relationship of the host entity with the target entity (e.g., a client, account, customer, subscriber, patient, tenant, prospect, etc.). By depicting entities in cartoon-like images, 102, along with backdrops that accurately portray that entity and its attributes, the biographical imagery server 201 presents a multidimensional scene that instantly invokes the viewer's innate, instinctive comprehension of the relationship and current status of the subject entity.

A primary premise of the biographical imagery server 201 and its methods is that image-driven system users are conditioned to, and expectant of, interpreting images rather than reading through excessive amounts of data as traditionally presented on Management Information systems (MIS) and similar account relationship systems. Traditional accounting and MIS systems, while sometimes providing graphs and charts, typically offer only multiple user screen 101 sequences of detailed data requiring successive paging or scrolling to achieve a complete presentation of the client's profile. The biographical imagery server's 201 method of instinctive image representation applies to any MIS system in any language and for any currency.

In concert with the user's standard procedures on their primary MIS accounting and service systems, the biographical imagery system composes and displays "mind's eye" images of the business's relationships to the user as shown in FIG. 1. By relating those relationships in universally recognizable cartoon like caricatures, the biographical imagery server 201 invokes those same natural response mechanisms that have guided mankind through millennia and that have supplied simple, accurate guidance to its population.

The biographical imagery server 201 composes scenes from aggregated 'transaction' records that are passively captured from 'events' occurring in the host MIS, phone, user interactive operations, and/or other system activities. The biographical imagery server 201 may interface with any database or legacy information system and may become quickly productive with little pro-active effort by the end user. To the business operator, the biographical imagery server 201 substantially reduces the time to make new unfamiliar personnel productive and mitigates losses from absences, mishandled events, and misdirected customers. The biographical imagery server 201 gives new, transferred, promoted, and even intellectually handicapped personnel an immediate, innate understanding of all the organization's relationships, enabling them to quickly become productive and to make accurate judgment decisions. The biographical imagery server 201 can also be used in defining organizational policies and guidelines and in training personnel to abide by them.

The biographical imagery server 201 also allows the user to assess the importance or relevance of incoming, or outgoing, telephone calls 103 by previewing the subject entity via the multidimensional scene. While the biographical imagery server 201 may display the multidimensional scene in a window directly within the user screen 101, a tandem monitor provides for full screen displays without disturbing or overlaying the user's current workstation operations. Legacy system formats seldom provide a comprehensive presentation of the tenure, scale, volume, demeanor, comparative value, and other attributes of the relationship that are communicated on the profiles of the biographical imagery server 201.

Figure 2:
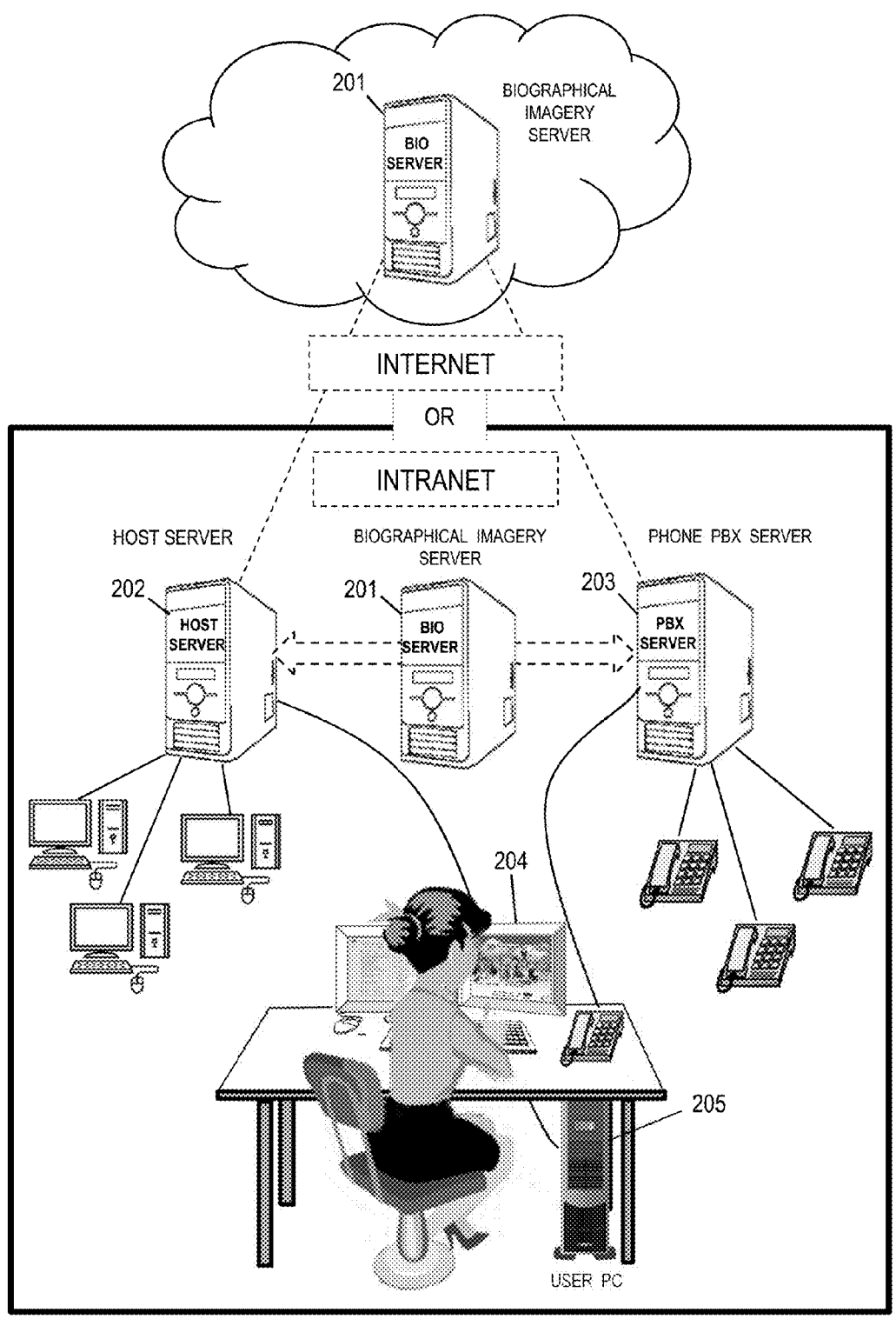
FIG. 2 is a diagram of the topology of the integration of the biographical imagery server with a host server along with a serial port attachment to the host PBX phone system.

FIG. 2 illustrates the typical configuration and connections in deploying the biographical imagery server 201 with the MIS production host server 202 and PBX phone system server 203. The biographical imagery server 201 can be physically located anywhere in relation to the host users. The biographical imagery server 201 may be configured for private, in-house 'intranet' use or it may be configured to use standard internet connectivity that allows for fully outsourced, remote implementation. While there are numerous connection configurations available, the biographical imagery server 201 typically operates as a terminal server to its host client, e.g., the host server 202, either as a remote 'arm's length' service or as a dedicated in-house server.

The biographical imagery server 201 is an extensible, stand-alone web server that can be scaled and tuned to provide top speed service and minimize its impact on host operations. The biographical imagery server 201 operates on a C# SQL-based platform and conforms to conventional development standards, systems security, fail-safe operations, and system recovery. The biographical imagery server 201 runs as a generic application so that it complies with all levels of host environment and system disciplines.

The biographical imagery server 201 receives both phone call events and host MIS system events. When a telephone call from a customer, client, vendor, or other person or company is received, or an outgoing call is initiated by the user, the host's phone system 203 issues an event message containing the incoming or destination caller's phone number using a standard phone record message protocol. Using technology common to contemporary PBX and similar phone systems, Station Message Detail Recording (SMDR) messages are generated for each incoming and outgoing call and are communicated to the biographical imagery server 201. In order to direct the biographical imagery server 201 responses to the correct user monitor, a routing map of telephone exchanges to user workstations along with the current IP addresses of the users' PC's as well as the current browser instance are established. Once identified, the biographical imagery server 201 can direct the responses to the correct host user devices.

These messages contain the time, date, and calling and receiving numbers of the parties of the phone call. These messages allow the biographical imagery server 201 to retrieve and immediately display the subject entity's profile on the user's monitor 204. When the incoming or outgoing calls are completed, another message is generated by the phone server 203 and sent to the biographical imagery server 201 to record the duration, disposition, and other pertinent statistics of the phone call event.

The biographical imagery server 201 operates as an independent server/cloud service to communicate with the host server 202. The user accesses the biographical imagery server 201 through as an internet/intranet-based application running on the user's PC workstation 205. In this fashion, the user always engages the current version of the imaging application running on the biographical imagery server 201. The user is required to log on to the biographical imagery server 201 with a user identification and password. The biographical imagery server 201 receives all of its event messages from the host server 202 through a secure internet/intranet connection via HTTPS/SSL communication protocols.

The biographical imagery server 201 similarly receives phone message events from the phone server 203 through a secure serial port connection. These messages identify the callers' phone stations and contain phone call details. Each message is logged and, as needed, modified to conform to the biographical imagery server's 201 internal message format. Incoming or outgoing phone numbers are cross referenced to the host system's 202 unique entity ID code in the entity table 416, which process is described in more detail below. This entity ID code is then used to retrieve, assemble, compose, and display a graphic representation of the entity's relationship with the host from its history of passively captured transactions.

Figure 3:
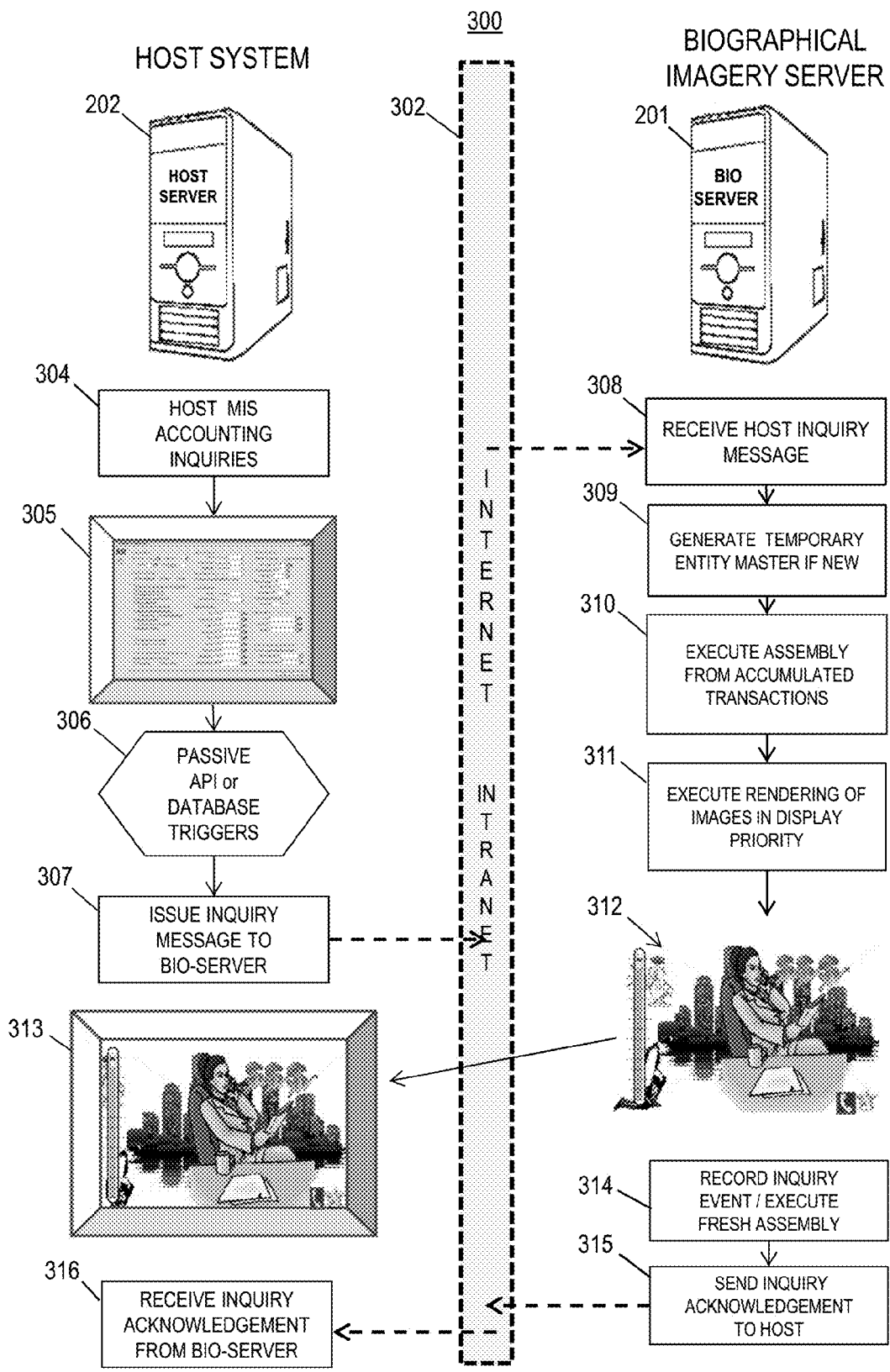
FIG. 3 is a flow diagram demonstrating how the biographical imagery server interacts with the host MIS/Accounting system in initiating, preparing, and rendering an entity relationship profile.

FIG. 3 is a flow diagram 300 demonstrating how the biographical imagery server 201 interacts with the host MIS/accounting system 202 in preparing and rendering an entity relationship profile. The user interfaces with the biographical imagery server 201 through a standard internet or intranet browser connection 302. As a terminal service, the biographical imagery server 201 awaits inquiry messages from the user.

The host system 202 user's screen 305 typically shows account profiles in numbers and letters that the user may scroll or page through to see the entire profile of the account. Typically, there are sub-menus that require the user to navigate through various screens to get a comprehensive idea of the account's status. The user may submit inquiries on the host MIS system using the various inquiry methods offered by that system 304. At some stage of the host's various inquiry routines, and the account's profile is displayed on that system's standard inquiry screen and the primary ID code of the entity is secured.

There can be numerous points within the host MIS system operations, such as a sale or payment posting, where an account reference or inquiry is routinely performed. At any of these full or partial inquiry points, an API (Application Programming Interface) or trigger in the host system's 202 database 306 can be engaged to send an inquiry message 307 to the biographical imagery server 201. The host's unique entity code is included in the query message to the biographical imagery server 201. The generation of these inquiry messages, like other events transmitted to the biographical imagery server 201, are transparent to the user who simply sees the image profile appear on their monitor 313 in sync with their host inquiry.

The biographical imagery server 201 database retains little or no identifying data on the host entities. It only needs to secure a unique ID code from the host for each newly submitted entity. If, upon receiving a message from the host 308 with an entity ID that does not exist in the entity master table 416, it will add that new entity 309 to the entity master table 416. The biographical imagery server 201 application presumes that all entity ID's received from the host MIS system are genuine and unique. This cannot be done with phone messages since they only have the phone numbers of the calling parties for cross referencing to the host entity ID. If no cross reference entity exists for a phone number, a temporary entity master is created that is subsequently reconciled by the user's administrator and updated with a valid host entity ID.

Upon receiving an inquiry message, the biographical imagery server 201 determines if that entity's assembly summary workfile 507 is current or 310 requires a new assembly of the transaction history. If needed, the entity's transaction history is assembled into workfile summaries. The entity's display screen 312 is then composed, including all background, midground, foreground, and fascia layers, and then rendered 311. The completed biographical imagery server 201 display is rendered on the user's monitor 313 in background to fascia layer order. The current inquiry event also generates 314 an inquiry transaction for the entity and a fresh assembly is performed after the current inquiry is completed in anticipation of its next inquiry. This avoids the assembly process for new phone or user interactive inquiry messages. An inquiry acknowledgement message may be sent 315 to the host server 202 if requested by the API or database trigger process which is received at the host 316.

Figure 4:
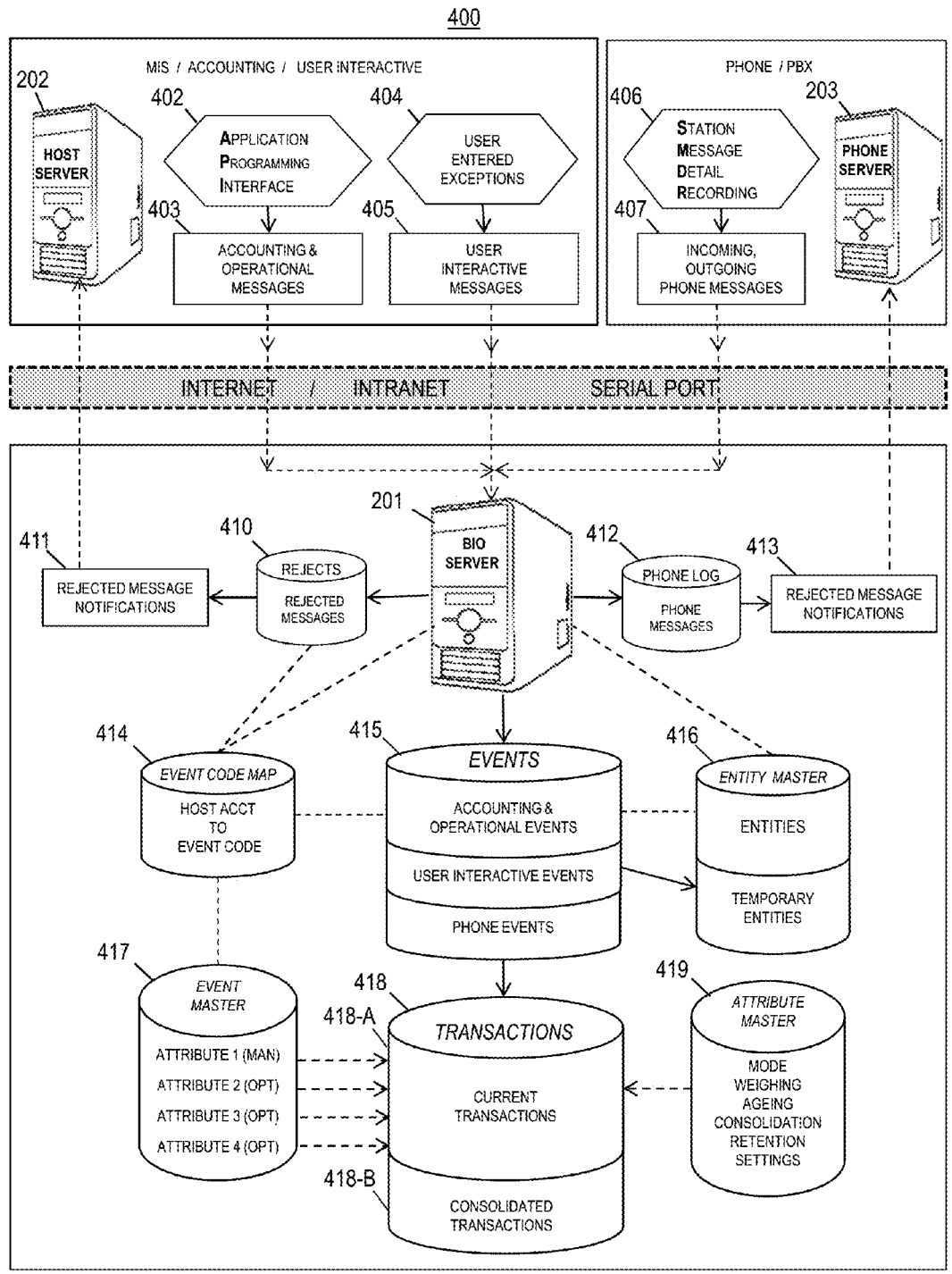
FIG. 4 is a flow diagram illustrating how various events and their subsequent transactions originate from operations in the host system and how they are captured, interpreted, recorded, assembled into summary form and prepared for rendering on the biographical imagery server.

FIG. 4 is a block diagram 400 illustrating the path of the event message through the 'capture' process in the biographical imagery server 201. It outlines how the biographical imagery server 201 receives event messages from various data sources in the host systems and generates their subsequent transactions. These message sources include those from the host's MIS/accounting system 402-403, host system user interactive entry messages 404-405, and the user's phone system messages 406-407.

The host server 202 generates formatted messages representing events that originate in its accounting and user interactive operations. Those messages are securely transmitted from the host server 202 to the biographical imagery server 201 using standard PTF or other standard communication protocols. The biographical imagery server 201 does not access or modify any data in the host server 202. If the biographical imagery server 201 needs to send acknowledgement of any action with the host server 202, such as a confirmation of the display of an entity relationship profile, standard secure communication protocols may be employed.

The host MIS (Management Information system) and accounting system may generate the greatest volume of the operational 'events' from which transactional records are aggregated. These events represent the numerous billing, payments, payables, disbursements, and other activities generated from accounts receivable, accounts payable, services, and other relationship impacting operations. The events that are issued to the biographical imagery server 201 are typically limited to primary income and expense events that reflect account relationship activities. These events do not commonly include corporate level accounting and administrative functions although any aspect of company activity can be directed to the biographical imagery server 201 relationship reporting.

These host generated events can also include recording of dates and terms (contracts, leases, subscriptions, rights of refusal, options, etc.) to supplement the entity relationship profiles. Attributes can be established that reflect such tenured events, deadlines, and expirations. These would show as forthcoming or past milestones on the biographical imagery server 201 profile. Importantly, the biographical imagery server 201 is totally transparent to the nature of any such activities as well as to the actual identity of any of the entities.

Transmission of the MIS and accounting data to the biographical imagery server 201 is provided by the utilization of the biographical imagery server's Application Programming Interface (API) 402 at strategic locations in the user's operational posting routines. Depending on the real time aspects of the user's accounting operations, the general ledger typically represents the conclusive point at which such accounting activities are recorded. Some general ledger operations, however, are posted in summary form or at deferred schedules in which case detailed relationship impacting events are collected at earlier points in the host system operations.

Each time a conclusive, relationship-impacting posting is made to the host accounts, a corresponding event message 403 is issued to the biographical imagery server 201 through the embedded APIs 402 providing secure, unilateral submissions of data from the host. Alternatively, the biographical imagery server 201 messages can also be generated using triggers that sense changes in the relevant user account database tables on the MIS. The appropriate data points in the host operations are established with the biographical imagery server 201 engineer and user administrator. Significantly, once these points are established, all of the biographical imagery server 201 operations are completely passive to the end user: The biographical imagery server 201 images are rendered in response to each inquiry made by the user in their primary system.

Phone call activity 407 comprises a significant percentage of event activity between the host and its constituent entities. The frequency, duration, and ultimate redirect of phone calls represent important factors in relationship activity. On contemporary phone systems, both incoming and outgoing calls identify the calling and the receiving parties. Each biographical imagery server 201 entity contains one or two or more identifying phone numbers by which the entity is referenced. The start of each incoming or outgoing call generates an inquiry message to invoke a corresponding entity display in the biographical imagery server 201. When completed, the duration of a call reflects important relationship factors of both parties. The frequency of calls between specific parties is also an important statistic in profiling the relationship.

Phone call data and resulting messages transmitted to the biographical imagery server 201 are generated by the PBX phone system 203 or a similar automated phone system. This data is typically supplied in 'SMDR' (Station Message Detail Record) or 'CDR' (Call Data Record) formats 406. Upon receipt, the biographical imagery server 201 logs each phone message 412 and converts the PBX formatted messages into the biographical imagery server's 201 own standard event message format. If an unidentifiable message is received, an error message 413 is returned to the PBX phone system 203 server. Incoming callers are identified from their phone numbers which are cross referenced in the entity master table 416. If an entity cannot be identified by their incoming or outgoing phone number, a temporary entity master is created to allow generation of the subsequent event and transaction.

New incoming and new outgoing phone calls identify the originating caller or subject entity being called, invoking the biographical imagery server 201 to immediately display an entity profile for those entities. Although the PBX phone system 203 transmits both the start and stop of each call in separate messages, the biographical imagery server 201 responds to the start of each call by displaying the subject entity profile. It uses the information from the completed call to record the event and generate the resulting transactions. As with the MIS accounting system, once these message connections are established, the related biographical imagery server 201 profiles are passively rendered to the user upon the receipt or initiation of any phone call by the user.

The biographical imagery server 201 events may also be generated through direct user interaction 404. If an episode or other extraordinary situation should occur when dealing with an entity, the user can note an exception event 405 for that entity. Should the subject entity be particularly nice, abusive, or difficult, and the user deems this to be worthy of noting, such a behavioral exception event can be quickly and easily recorded through the use of images. As with MIS and phone events, each such exception posting is recorded as an event and becomes an element in composing the user profile. Exception events, such as patience or impatience, can be factored to rapidly accelerate and then rapidly decelerate in attribute weight, that is, spike and then quickly diminish, over a shorter age period so as to not unduly skew that entity's profile in the longer term.

By clicking on the 'exception' star icon 1011 at the lower right of the biographical imagery server 201 screen, the user can invoke a menu of various call disposition icons 1103 from which to choose that can indicate the demeanor of the call. This function provides a gradient rating-scale 1105 which allow the user to select the specific level to which this particular entity should have that exception noted. As each user activated exception is recorded, an acknowledgement is issued to the user and the profile is automatically reassembled and displayed to reflect the impact of that latest event.

The user is also able to record a 'disposition' exception 1114 at the conclusion of each phone call, indicating the results and follow up, if any, of the call. This transaction becomes a primary factor in evaluating the proportional success of any specific 'operator' with the target entity and becomes part of the satisfaction rating scale displayed with the user and the host entitles contact profiles.

Since there is no direct association to any specific entity identifying information, the database residing on the biographical imagery server 201 is transparent to the actual identities of the target entities, e.g., the clients of the host. Primary identification data, such as phone and host identifiers, can be encrypted as desired for further security.

Events that originate in the MIS and Accounting operations of the host typically employ a standard chart of accounts for the posting of sales, order entry, invoicing, payments, expenses, disbursements, and an array of similar accounting activities. While many activities, such as legal actions, impose their own distinct factors on the client relationship and the resulting target entity profiles, many share the same attributes and so combine their values towards a common image. All charges and payments, for instance, accrue to an 'outstanding balance' attribute and its related image.

The biographical imagery server 201 validates each host event message against the event code map 414. Any MIS event message that does not have a valid entry in the event code map 414 is rejected 410 and a notification message 411 returned to the host server 202. All event messages, whether valid or invalid, are recorded in the events table 415. The event code map 414 is a user defined table that translates the host's native chart of account identifiers into the common biographical imagery server 201 event codes with their related event masters and attributes. This directing of events to common attributes also occurs with the phone events and with the User Exception events. Reports of code mapping for each event source may be generated to help identify the desired events and their associated attributes. These tables are derived and tuned by biographical imagery server 201 engineers who work closely with the client's accountants and administrators during the implementation phase.

The event master table 417 directs the various MIS/ accounting, phone, and user interactive activities to specific attributes associated with each event. Since a single event can impact more than one attribute, up to four attributes can be referenced in an event master. Since a single attribute can invoke a range of images based upon the accrued value, a large spectrum of each image's minimum to maximum range can be engineered to reflect the various values anticipated in each event. An annual subscription or rent charge, for instance, would impact total billing for that entity and, at the same time, accrue to their running total charges due. Payments made against those charges would similarly accrue specifically to total payments and commonly to total running charges, but not to total billing. The event code map 414 provides the engineers with a way to direct multiple accounts to the same attribute, or to direct the accounts to separate attributes and their resulting images.

The event master table 417, along with the attribute master table 419 and its associated images master table 508, are the core dynamic of the biographical imagery server 201 system. Since many events may elect a common attribute, the event master table 417 offers a special 'weight' factor that allows it to distinguish that event's particular impact on its selected attributes. This 'event weight' value is added to the respective attribute weight when the transaction is propagated. Events in the event master table 417 may be changed from active or retired but may not be deleted once used. Like its subordinate attribute and image tables, the event code utilizes a four-tier hierarchal structure with the following tiers: section, group, class, and type. This hierarchal structure allows for higher tiers' image layers to be deployed in composing the resulting multidimensional scenes with its lower tier images.

The attribute master table 419 defines the characteristics and images to which the events and their transactions are associated. During assembly of the entity's transactions, the cumulative values in each attribute code ultimately determine the resulting images to be displayed. An attribute can be a positive, negative, or neutralizing factor in the overall profile of a target entity. For business purposes, it represents an accumulator of either unit counts or quantities of a specific value, such as times late or total purchases. For character profiling, an attribute can accumulate values regarding attitude, punctuality, reliability, and other subjective factors that can be later portrayed in the profile.

In organizing the repertoire of relationship profiles, the user would start by defining and categorizing the image or image range it expects to present and then associating the attributes and their values that align to that image and then to the events in the host operations that relate to those attributes. The attribute master table 419 allows the user to specify ageing, acceleration, consolidation, and retention rules that govern the impact that each attribute asserts on the resulting images in the multidimensional scene. Like its event master counterpart, the attribute master may be active or retired but may not be deleted once used. Its four-tier code structure (section/group/class/type) relates directly to the value range of images within that code. The 'group', and 'section' parent codes can define background and midground images for any spectrum of entity characteristics.

The transactions table 418 contains the resulting product of processing event messages 403, 405, 407 against the event code map 414, event master table 417, and attribute master table 419. Accumulated with other transactions of that attribute code, it becomes the primary element in the selection of images and the composition of scenes of the entity relationship profile. For each attribute referenced in the event master, a separate transaction is generated. When the event message is processed, the factors present in the event master and attribute master along with the codes, locations, accounts, dates, weights, rules, and values transmitted in the event message are recorded into the transaction.

The transactions table 418 holds the current transactions, consolidated transactions, and, until purged during maintenance, transactions past or approaching their attribute's retention date. The impact of any transaction against its entity's profile is dynamic with value weights being adjusted up and down depending on the age of the transaction. In some MIS systems, future dated transactions may be permissible and may not be computed into the profile until the effective date.

The attribute parameters inherited from the attribute master at the time of transaction generation remain fixed throughout the life of the transaction regardless of subsequent changes to their originating event master, attribute master, or image master. In order to optimize the performance of voluminous transactions tables, transactions are subject to consolidation into summary transactions as well as to retention rules that serve to level out certain attributes' impact on current profiles.

The entity master table 416 identifies the client, customer, account, patient, subscriber, member, vendor, prospect, or similar primary business unit of reporting. As a transaction is being recorded, the image processing server validates the entity identification received from the host to be sure there is an existing, valid entity. This entity number is the primary key in retrieving and assembling the entity relationship profile.

The biographical imagery server 201 application may hold little, if any, specific information about an entity's true identity other than this key. Either at the initiation of the system or as events are being transmitted, the biographical imagery server 201 creates entity masters using the unique entity key supplied by the host MIS system. If a new entity is introduced in an event message directly from the host MIS system, the biographical imagery server 201 system assumes it is a valid entity ID and will create that entity in the entity master table 416.

For phone events with unidentifiable entity numbers, because of the frequency of such new contacts through this source, the biographical imagery server 201 system creates a temporary entity master in the entity master table 416 and alerts the host that such a temporary entity exists so that a valid, MIS recognized entity code can be returned to the biographical imagery server 201 and be updated to agree with the host system's native ID code. This entity master is then available to be validated against forthcoming phone and other MIS and user events. The entity master holds location, phone, rank, and other limited demographic keys for each entity that allow it to be grouped with related entities. This allows the biographical imagery server 201 to offer browsing within demographic ranges and to arrange comparative scenes. When selecting vendors, for instance, the biographical imagery server 201 can show a selection of vendor entities for a specific trade (attribute range) or area (entity location).

Figure 5:
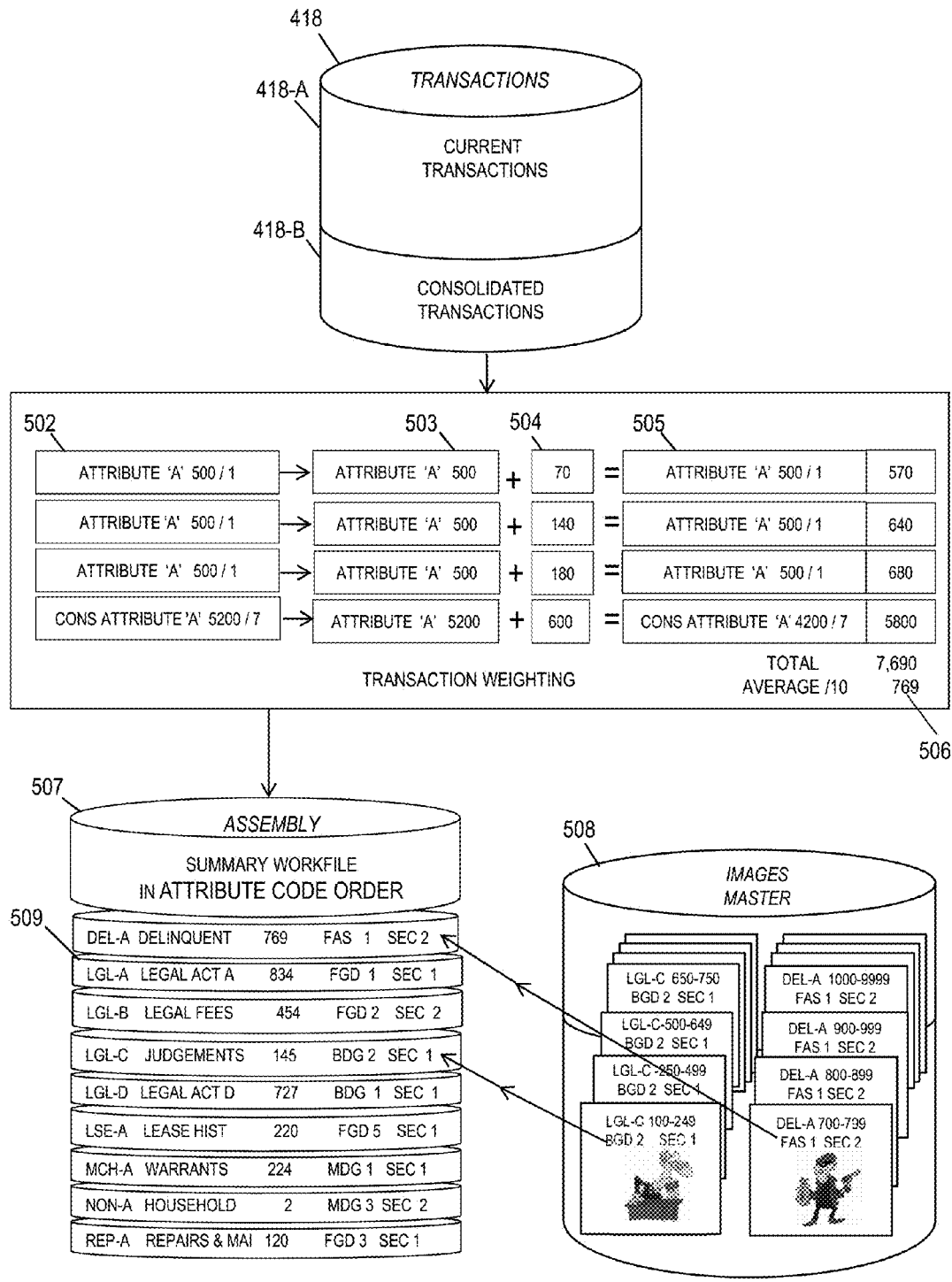
FIG. 5 is a flow diagram of the assembly process in which the selected range of detail transactions are weighed based on their attribute settings, accumulated into attribute summary records, and associated with their weighted images for prioritized rendering.

FIG. 5 illustrates the functions within the assembly process that accumulates transactions into summary records for each attribute in preparation of rendering the display. To display the entity relationship profile on the user's screen, all of the transactions 418 that have been accumulated for that entity 418A, including consolidations 418B but excluding transactions beyond their specified retention dates, are 'assembled' into an assembly summary workfile 507. This assembly process applies ageing, acceleration, and, where applicable, averaging of each transaction while accumulating them by attribute code. Due to the potential volume of current and consolidated transactions, assembly is optimally performed globally on a scheduled maintenance basis, on demand when a new transaction is delivered, or by operator request following an exception posting.

For each attribute being assembled into the summary workfile, the unit 'instance' counts are also accumulated for calculating the average of all the transactions in that attribute, including cumulative unit counts for consolidated transactions 501B. Each transaction 502 processed into the assembly summary workfile 507 carries the parameters inherited from its attribute master and its event master at the time of its generation. These parameters govern how much weight 504 will be computed and added to, or deducted from, the original transaction value 503 based on how much time has passed since, or before (acceleration), its creation.

An acceleration parameter has been supplied to allow increasing focus or emphasis on certain future quantifiable events such as the number of days before an expiration date. Some transactions, such as payments, have no weight added since there are countering transactions against their original billing transaction. Other attributes, such as a demeanor exception, want to diminish their impact with time. The weight factors can be a positive or negative whole number, a percentage added, or a percentage discount applied based on how many days, months, or years since, or before, the transaction date.

When all of the transactions and consolidated transactions for a specific attribute or attribute tier 505 have been accumulated, the total value may be divided by the unit count to provide an average of the attribute value 506. As elected in the attribute master settings, certain attributes, such as delinquent balances, are not averaged since the images are based on cumulative whole value. This total value is then used to access the layer and sector screen position on the image plane from the images master table 508 so that each attribute 509 in the summary workfile 507 can assume its prioritized position on the profile display.

The assembly summary workfile 507 is arranged and processed in attribute code ascending order (see Database Tables in Appendix 'A") for the assembly process so that all transactions of that code can be aggregated. In the subsequent rendering phase, the assembly summary workfile 507 is arranged and processed in image layer and sector position order into a 'rendering summary workfile' 601.

In order to assure the most accurate and fastest display of the entity profiles, each screen position is processed in lowest to highest value (dominance) order within the entity and within each layer of the profile. For this reason, layer and sector screen positions based on total attribute value from the selected images masters 508 are copied, or joined, to the attribute summaries 509 during the summary workfile assembly.

Based on the four tier hierarchy in the attribute code, transactions summary totals are also accumulated into the parent tiers of each transaction for the possible rendering of 'section', 'group', and 'class' tier background and midground images. Those images are processed after all of the transactions for the target entity have been accumulated in the assembly process and are included in the rendering process.

The assembly process also calculates transaction history arrays in both quantity and counts for the attributes past twelve periods so that a histogram of similar array can be displayed. These are not weighted but reflect the actual original values 503 of the transactions in their respective periods. While the display defaults to the past twelve months, a feature of the history display is to allow the user to dynamically select what the term of the array is to be calculated: hours, days, months, years. Consolidations are placed into their nearest year.

For 'contact view' profiles that reflect a limited survey of attributes such as the 'phone' class, an additional 'view' of 'operators' within the survey range for the target entity is derived during the assembly process and, upon completion of the target display, the process renders each of the highest value 'operators' in their order of survey range total value. Since this assembly process may be time consuming for entities with large volumes of transactions, assemblies are processed in advance as each new transaction is added to that entity's records so that inquiries can be rendered quickly. Each entity maintains an entity master control record that indicates the most recent assembly so that a fresh process can be performed as necessary at the time of inquiry. The result of this process is the assembly summary workfile 507.

Figure 6:
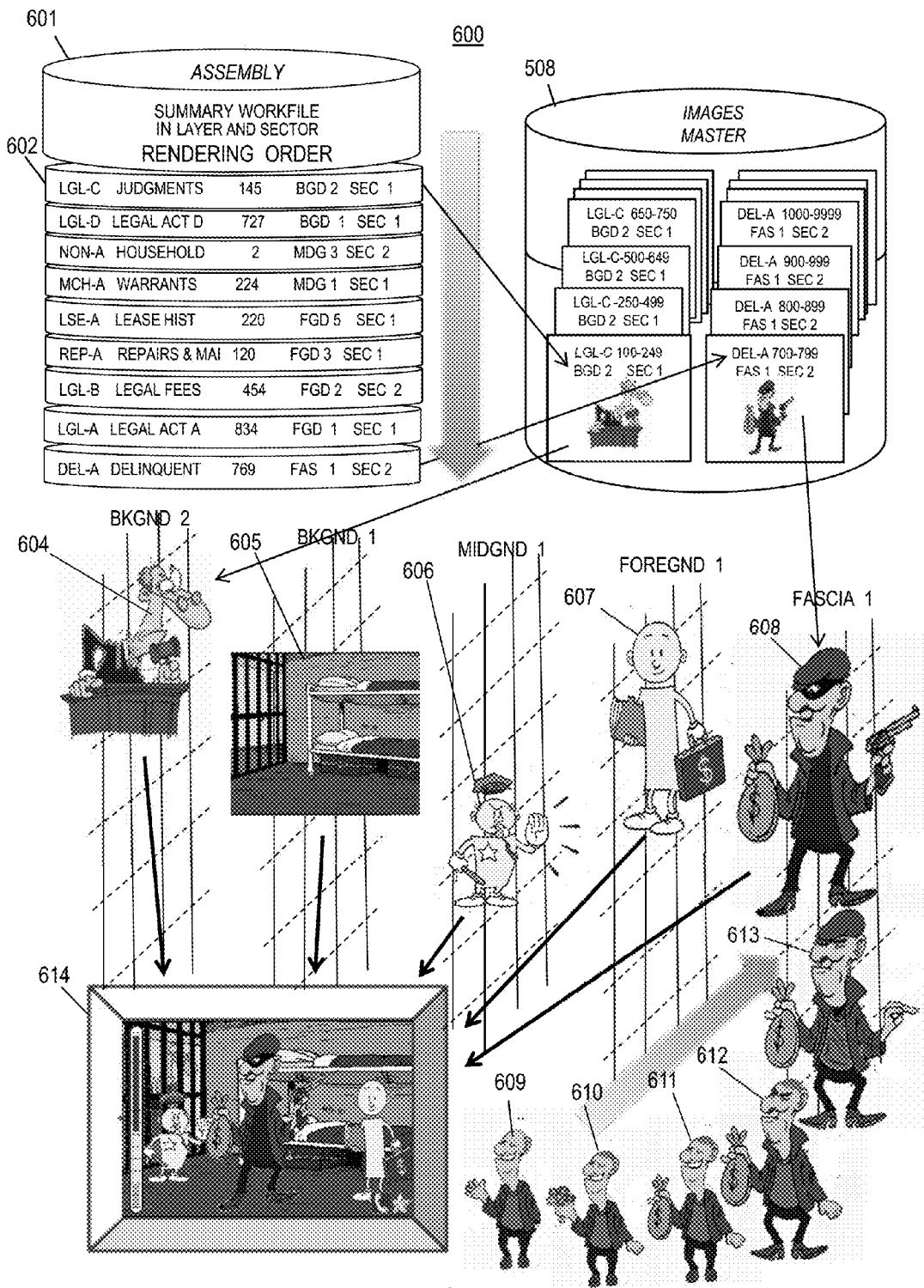
FIG. 6 is a flow diagram illustrating the rendering process performed by the biographical imagery server illustrating the translation of transactional attribute summaries into images with prioritized placement into background and foreground layers.

FIG. 6 portrays a limited execution of the rendering process of the biographical imagery server 201 application and shows how the scaled images are selected and applied. This process, again, is initiated passively in the host MIS system by executing an API to generate and transmit an inquiry message to the biographical imagery server 201. The phone system's 203 PBX also generates an inquiry message at the initiation of an incoming or outgoing call to an entity.

The actual rendering of the assembly summary workfile 507 is a separate process from the transaction assembly since not all renderings require a re-processing of the assembly summary workfile 507 for the target entity. Assembly is optimally performed globally on a scheduled maintenance basis or on demand when a new transaction is delivered or by operator request.

After processing, the assembly summary workfile 507 contains an attribute summary record 602 for each active attribute of the target entity. Each workfile summary record contains, based on attribute option, either the average or absolute total of the current and consolidated transactions for that attribute, reflecting ageing, acceleration, and other weighting factors. These transaction summary records also include the transaction unit instance counts from both current and consolidated transactions reflecting accurate averaging. A logical 'rendering summary workfile' 601 (view) is created that utilizes the layer and sector positioning copied into each summary record during the assembly stage and thus allocates the sectors to the highest value candidates for each layer. From the summary records, the nearest value image in the images master table 508 for that attribute Code is determined. These records are then ready to have their images displayed on the user's biographical imagery server 201 screen.

The final rendering routine processes the top 'N' images contending for primary placement within each layer and, by displaying each attribute summary record 602 in lowest to highest value order, within that layer, assures that the most dominant attributes end up on the top with the most exposure. Available (vacant) sectors may be allocated to lower echelon images within their layer group allowing them to 'move up' the display order.

Based on the values in the assembly summary workfile 507, the correct images are selected from the images master table 508 and displayed in specified sections on the screen. Attribute summaries are processed and layered in reverse value order within background, midground, foreground, and fascia sections so that the most prominent attributes prevail. The biographical imagery server 201 also renders the image, if any, of each level of the attributes' hierarchal group (section/group/class/type) so that background, midground, and foreground layers for each tier in that code, if present, are asserted in the overall scene.

The detail of the summaries in the sample assembly summary workfile 507 reflects a partial series of attributes for which attribute summary record 602 values have been accumulated. These values have been accumulated from their respective transactions and have also been weight adjusted according to date ageing. Each attribute summary record points to a specific image within the range of image masters in the images master table 508 for each attribute code.

The images master table 508 holds the actual .jpeg, .png, .xcf, .gif, .flash, and other format types of image objects that are projected onto the user's screen. Inventorying and arranging the image repertoire to suit the specific business or organization is the starting point in implementing the biographical imagery server 201 application. In concert with the attribute master table 419, the images master table 508 uses the same hierarchal tiered code structure (e.g., section, group, class, and type). It also has value-range keys within its code structure that allow the user to define distinct images for various value ranges within the attribute. Each images master 'range set' can have as many iterations of that image as desired to reflect the various levels in its attribute value. At least one of the images in the attribute's set represents the maximum value of '99999999' or highest range in the attribute.

Each tier (e.g., section, group, class, and type) of the hierarchal image code can independently specify background, midground, foreground, or fascia layers in the image plane that their image should occupy. The images from higher tier codes are inherited by its lower tier images and are used to fill out vacant layers, if any, on the entity display. This inheritance feature minimizes the repetition of secondary images for each hierarchal group.

The images master table 508 accommodates either 'vector' or 'sector' screen location specifying where the image is to be positioned on the image plane. The sector addresses are regarded as preferences but are subject to relocation based on higher value images displacing images to other sectors. The ageing/acceleration 'weighting' feature of each attribute allows the user to temporarily exaggerate any attribute characteristic within the entity relationship profile to apply sensitivity to recent or forthcoming issues. Interactive user exceptions also provide dynamic value impact on the selected attribute.

Images 604-608 portray the successive images that may be 'painted' onto the user's screen in composing the entity's profile from various attributes and from the range of image values within a single attribute. Each image master entry specifies its preferred placement within the respective background to foreground layers as well as the specific screen location within that layer. The images are applied in background to foreground order, with higher tier (e.g., section or group) images applied before lower tier (e.g., class or type) to achieve the highest degree of current transactional representation. The highest value or 'weight' images are similarly given the highest (nearest) layer placement to assert those most dominant attributes. Images may be 'trumped' from their default location and be reassigned to lower, available sectors on the image plane to achieve the most comprehensive scene.

Images 609-613 illustrate the progression of successively overlaid images in the fascia layer based on attributes with increasingly dominant values. Especially in the fascia or 'face' layer, the application of facial expression, body style, attire, and other physical attributes express the most dominant traits of the entity. While the example may be extreme, the initial image of an innocent person morphing into a bandit by applying a series of clothing, body language, props, and facial changes (e.g., shy wave, hand in pocket 609, bouquet of flowers 610, no flowers, money bags 611, dark eyebrows, jacket collar up, shuffling feet 612, dirty shirt, pointing to distraction, hat over eyes 613, and the final image with mask, gun, and threatening stance 608) serves to demonstrate how profiles are substantially impacted by applying attributes.

In this very limited example, the composed user screen 614 shows the completed scene which includes the 'exception star' icon. An advanced user screen may provide a number of optional displays, such as comparative entities, scrolling through adjacent entities, and similar searches. The user does not have to erase or do any clicking on the biographical imagery server 201 screen to receive the next profile from the host system 202. The images are automatically replaced when the host issues a new inquiry. The biographical imagery server 201 application does provide for the user to restore the last 'N' profiles should the user want to 'go back' to a prior display.

Figure 7:
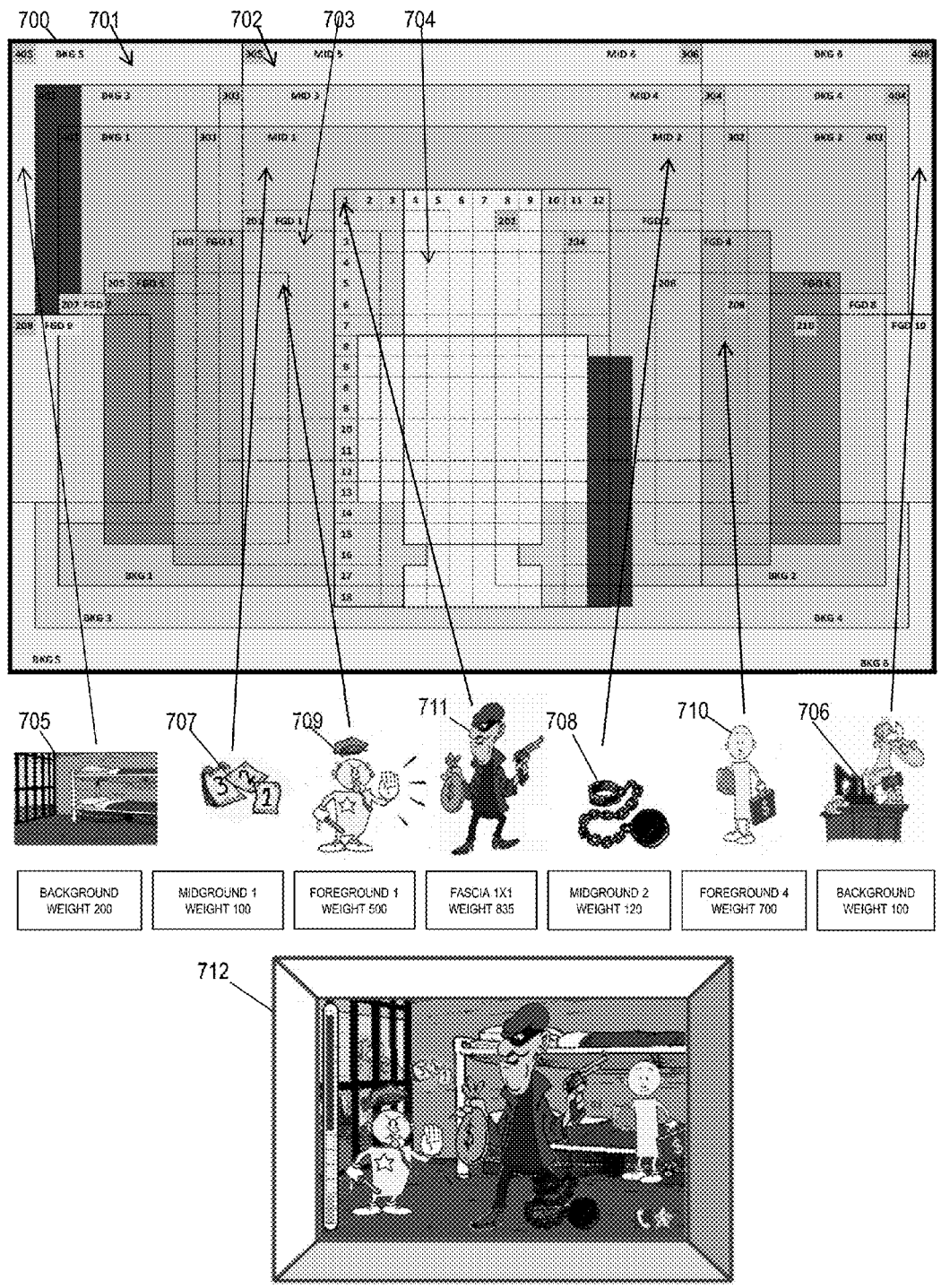
FIG. 7 is a diagram of a single entity 'target' image plane according to one embodiment of the present disclosure depicting the placement of scaled images in prioritized sectors based on aggregated transactional values.

FIG. 7 demonstrates the positioning of attribute images on the biographical imagery server's 201 target image plane 700. Examples of various image plane formats are shown in the biographical imagery server 201 data tables in Appendix A to the specification. This is one of the screen palettes upon which successive layers of images are rendered to portray all of the active attributes that the entity has accrued into its transactions summary and history. The location on the screen of those images is governed by layer and sector parameters that are set in each of the image masters (e.g., the images master table 508 of FIG. 5).

There are two primary image plane formats in the biographical imagery server 201 application: 'target' and 'contacts'. The target image plane (FIG. 7) accommodates a single target entity display and maximizes the entire screen display area for that one target entity. The contacts image plane (FIG. 8) accommodates a full target entity display in one third of the screen area and up to seven fractional contact entity displays on the remaining screen area.

The 'target image plane' area utilizes four overlapping layers: background layer 701, midground layer 702, foreground layer 703, and fascia layer 704. The contacts 'image plane' area may utilize only two of those layers: foreground layer 703 and fascia layer 704. As in a landscape painting, successive layers of nearer and nearer views are painted on top of preceding views. The biographical imagery server 201 images share this technique and anticipate certain amount of overlapping by top layer images, obscuring certain sections of previously rendered images. The biographical imagery server 201 images are transparent in their opaque areas for this reason. The respective layers and the sectors within each of the layers impose specific dimensions and pixel size limits. For prototype purposes, the background and midground layers are landscape orientation at roughly 4:3 aspect ratio and the foreground and fascia layers are portrait orientation at roughly 4:5 aspect ratio.

Within each layer, the order of display is based on the aggregated value of that attribute. Staging of this display order is started with the lowest attribute values. When processing an attribute at the lower 'type' tier, the parent images of that attribute code ('class', 'group', 'section') are also invoked and, if images are active at those levels for the process layers, those images are staged for display in their respective layers and sectors. As these images are processed in reverse 'value' order within the attribute code, the rendering process will stage as many background overlays as are necessary to fill all of the available sectors in each of the layers. For performance optimization purposes, the image displays may be computationally staged in each layer before actual rendering of the final images. After all of the layers and their prevailing images have been arranged, the image objects are retrieved and displayed in ascending layer and sector order.

For any of the image plane layers, each attribute can have a range of images that scales in intensity based on the attribute's aggregate value at the time of assembly. Thus, a ten year client can show depth that a two year client may not. The background layer 701 of the biographical imagery server 201 screen display is comprised of six 'sectors', accommodating the six highest value attributes to display their image within that group. By selecting 'background' as the location parameter in the image master, the image is included in the staging and value alignment of background layers. Background images, in landscape orientation, are intended to cover the fullest depth and width their sector's area of the screen. Background sector images are general scenes relevant to the attribute code. An attribute reflecting long tenure might thus associate a background image showing a wide, winding trail with numerous milestones while a short term attribute might offer an image of a narrow, short trail with little or no interim milestones.

Background images are composed with expectation of being overlaid with other images. To maximize the exposure of multiple overlays in the background layer, the image plane has a step-down technique that retains as large an image as possible on lower value background images while superimposing higher value attribute images nearer the front of the layer. This step-down technique is also applied at the midground and foreground layers to afford maximum image exposure on lower value images in those layers. Details regarding the image plane and specifically the 'overhead' view according to the step-down method are shown in the biographical imagery server 201 data tables of Appendix A.

The midground layer 702 of the biographical imagery server 201 screen display is similarly comprised of multiple positioning sectors (in this example there are six positioning sectors), allowing any active attribute to elect to display its image in that group. Unlike the background layer, midground layer expects more specific attribute images that are less than full screen width and less expectant of full overlays. These would typically provide volume images of dollar sales, annual or life to date revenues, claims, bounced checks, length of lease, etc., that ought not be trumped and overlaid by less strategic information.

For the background layer 701 and midground layer 702, odd numbered sectors (1, 3, 5) are upper left justified in their respective image plane areas, and even numbered sectors (2,4,6) are upper right justified in their respective image plane areas despite the intention of full overlapping of each odd/even pair within each layer. Images assigned to these sectors accordingly should afford lots of opaque area especially in the lower (1-4) foreground layer 703 and fascia layer 704 tiers.

The foreground layer 703 of the image screen may have ten dynamic attribute image locations for which the highest value attributes contend for the foremost positions. This layer represents the more individualistic attributes such as delinquency, legal actions, complaints, etc. With ten discrete portrait sectors, albeit much smaller in size than the background and midground layers, the foreground layer commands front line visibility and can portray significant detail about the entity. It is anticipated that any of these images will offer 'drill down' capabilities to allow the user to examine the detail transaction that support the attribute values.

In the contacts format, a 'survey' of a select 'section', 'group', or 'class' tier of the entity's attributes are rendered for the one to four contact entities, such as with phone contacts or specific trade contacts. This limits the array of attributes processed and displayed in profiling those contacts. Scaled and color coded images of the entities' statistical experience with the target entity is displayed in ratingbars 1009 for each of the five contact sectors.

The fascia layer 704 of the image screen provides the user a virtual caricature of the entity as a composite of their most distinguishing attribute values. The fascia area may be comprised of a 12×25 addressable box grid. The sector area is further sub-defined into head, sides, body, and feet to accommodate detailed face and body part images. The fascia layer provides either 'sector' (fixed) or 'vector' (variable) image locations, with addressable points of the image area available to construct a facial collage of the entity's demeanor, age, attitude, etc. These may include pictures or avatars of the entities, especially when host entities are displayed. These images and scenarios are limited only by the creativity of the user and the detail of the attribute definition.

The biographical imagery server 201 images, 705-710, are the graphical representation of specific attributes for which values have been accumulated. They each indicate the layer and 'preferred' sector positioning. Because certain images may incline to a right or left screen orientation, sector 'preference' is offered and considered by the rendering program. The final position of an image within its layer is nonetheless dependent on its attribute value order and availability. The alignment of such prevailing images is part of the biographical imagery server 201 engineering with the user.

Note that the images have been numbered out of order to accommodate straight reference lines on the image plane. Image 705, for instance, has specified background but with no sector preference. That image is intended to represent the full background of the scene and will fill the entire background 5 area on the screen. Image 706 has specified background also without a sector preference but because its accumulated attribute value is lower than the other background image, it is rendered first, behind image 705 (see person peering through bars in composite scene 712). Midground layer image 707 and image 708 will overlay the background layers with the blank areas of those overlays transparent to preserve most of the original background scene.

Image 708 shows a preferred location in midground sector 2 of that layer. Accordingly, the biographical imagery server 201 rendering process locates that image 707 in midground sector 1 since it was unassigned and available even though its attribute value was less than image 708's attribute value. Ordinarily, the highest attribute value would receive the foremost display sector. Image 708, the ball and chain, is subsequently overlaid by the 711 fascia layer image. This demonstrates the use of the midground layer to asset the pertinent attribute factors but not supersede foreground or fascia layer priority images 709 and 710 have selected separate sectors in the foreground layer.

The fascia image 711 commands the premium fascia space since it contains the most dominant of the entity's attributes. Any of the backgrounds or midground images could have been invoked at any of the hierarchal tiers of the attribute's 'section', 'group', or 'class' id code. The face attribute could also have selected a different image than the body from a range of image values at the 'type' level. This 'pecking order' versatility allows the user to compose any facial expression based on value scale images relying on the biographical imagery server 201 for computational accuracy. A countering attribute might also have superimposed (overlaid) a different face or part of a face on this display. After the contending layers and sector assignments are aligned, the composite scene 712 is displayed in back to front image order.

Figure 8:
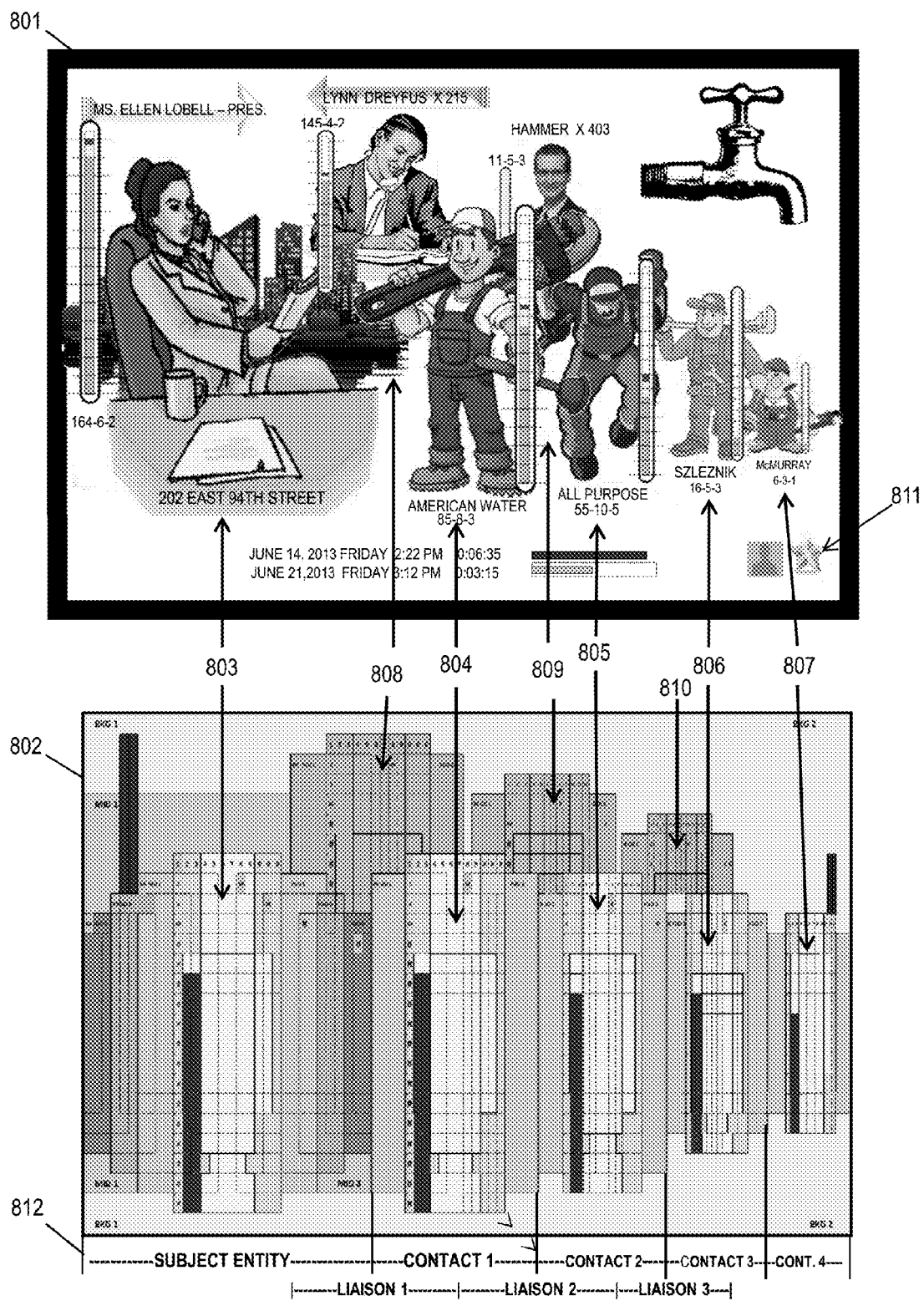
FIG. 8 is a diagram of a multiple entity 'contacts' image plane according to one embodiment of the present disclosure depicting the prioritization of multiple entity image placements in prioritized sectors based on aggregated transactional values.

FIG. 8 demonstrates the biographical imagery server's 201 'contacts view image plane' display schema and the positioning of attribute images 802. The legend at the bottom of the image plane 812 describes the display areas of the respective target and contact entities. Various image plane formats are shown in the biographical imagery server data tables of Appendix A. The 'contacts view' image plane functions like the 'target image plane' but with multiple entity display areas. Both views provide a template for positioning and overlaying images that reflect the degrees of value in an entity's history.

The 'contacts view' 801 is one of the screen palettes upon which successive layers of images are rendered to portray the target entity and four of its highest value contact entities 803-807 who have event transaction history in a certain 'survey' of attributes. The contacts view can also display between one to three 'Liaison' or 'agent' contacts representing those host entities who manage the relationship between the target entity and the contacts 808-810. Typically, this 'liaison' format reflects a management company or intermediary agency who engages the host resources on behalf of the 'client' entity. These entities are identified as 'operators' within the events issued on behalf of the target entity, providing an intermediate channel of contact control. Dispatchers, agents, salespersons, and central station services would be typical 'operator' entities. While the services are rendered by the contact entity, the Liaison is often the entity who communicates with the target entity regarding such services and thus is displayed as part of the contact view.

The 'contacts view' 801 image plane display shows the logical layout of the display screen. It is divided into eight primary areas. The 'target entity' area 803 is where the target entity profile is displayed. This area includes two midground layer sectors, six foreground layer sectors, and the full fascia layer. Despite the limitation on the number of sectors, the same assemblage and value rules are used to process the target entity attribute summaries and in assigning the topmost sectors in the midground and foreground layers. The fascia layer attributes are fully processed with all images being applied in value order, lowest to highest. The two sectors in the background layer are full screen width but, rather than reflect the background images of the target entity, these background displays, if any, are retrieved from the 'section' and 'group' tiers of the attribute 'survey' range (see below) selected by the user, such as 'phone calls' or 'plumbers'.

The contact view 'survey' function selects a specific range of attributes with their accompanying images allowing the user to see just the 'phone' or other chosen range of attribute activity between the target entity and the contacts. The default survey range of the 'contacts view' is pre-set to the 'phone calls' class of the attribute table to respond to spontaneous phone inquiry messages. By clicking the 'exception' button 811 while in 'contacts view', the user may specify any attribute range to be surveyed from the hierarchal 'section', 'group', 'class' or 'type' tiers of the attribute table 419. As with the other attribute display algorithms, the higher order tiers of the attribute code 'family' ('section', 'group') may contribute background and midground images into 'vacant' available sectors.

As event messages are generated, either specific or default entities may be recorded as the host 'operator' who initiated the event between the target entity (client/customer/patient/etc.) and the 'contact' (staff/vendor/agent/called) entity. When processing a 'contacts view', the system creates 'views' of (sorts) all of the target entity's transactions in the 'surveyed' attribute tier (the survey range), indexing by 'contact within target entity' and indexing by 'operator within target entity'. The system then prepares a 'contacts' assembly summary workfile 507 that yields which contacts have the four highest transaction counts or highest 'value' totals for that survey's attribute range and also prepares an 'operator' assembly summary workfile 507 that shows which three liaisons (operators) have the corresponding highest values for that survey.

From those transaction summary record statistics, the biographical imagery server 201 is able to compose profiles of the host 'contact' entities and the host 'operator' entities in order by heaviest activity. In the 'contacts view', the profile compositions for each of the top four contact entities 804-807 and top three 'liaison' 808-810 are limited to two foreground sectors and the fascia sector. Despite the limited sectors displayed, all of the attributes within the specified survey range are processed to achieve accurate, top-most images. As with the target entity, all of the fascia attributes of the entities are processed for the fascia displays.

In this 'contacts view' 801 example, the user has selected 'Plumbing' at the 'group' level for this survey. All of the entities in the system who have had 'Plumbing' events 804-807 with the target entity, 803 are shown in heaviest experience order. The two 'liaisons' that have performed as operators for those services 808-809 are also displayed in their designated sectors. The large faucet in the background tier is inherited from the parent 'section' or 'group' images for that survey range.

Figure 9:
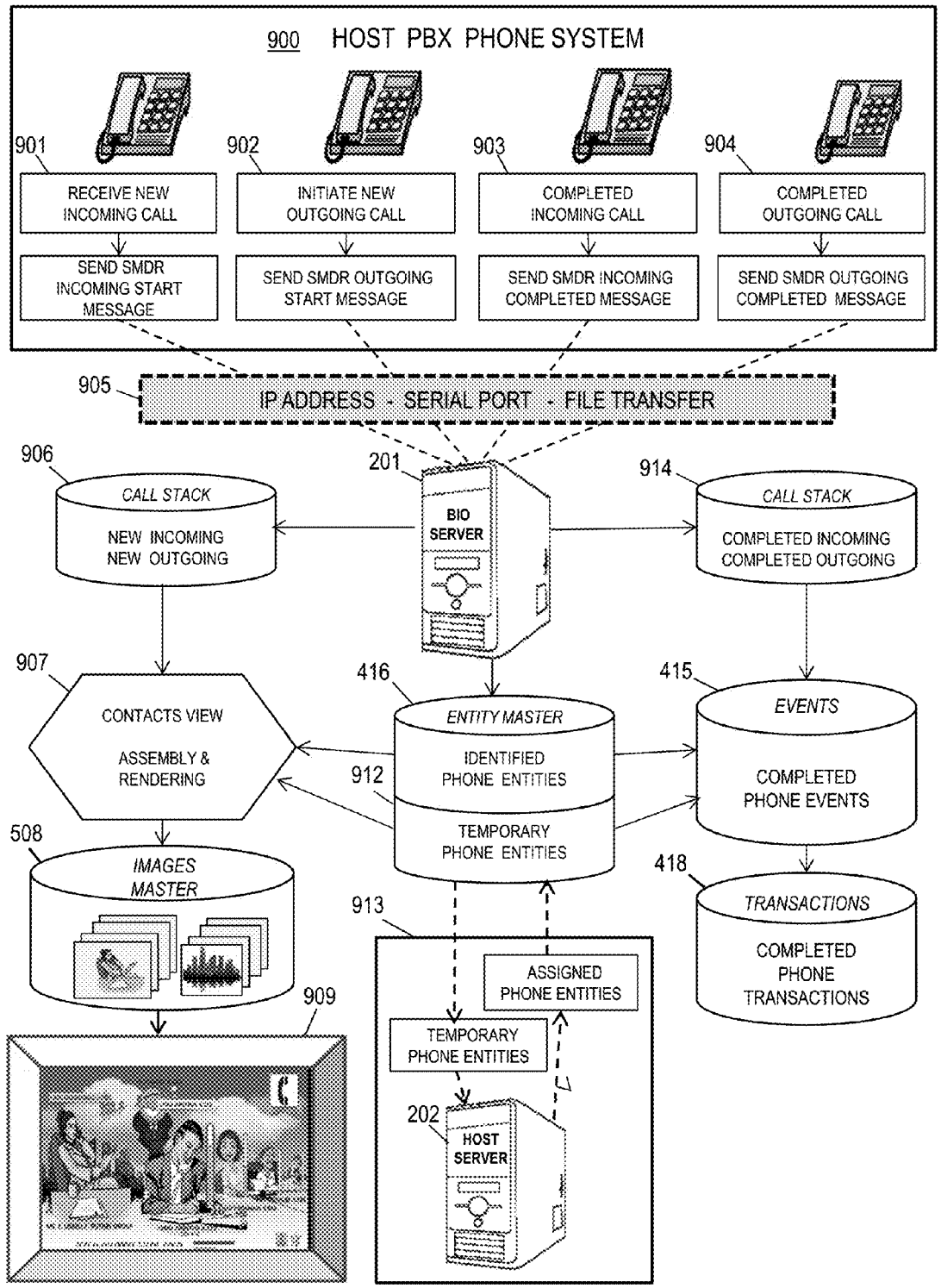
FIG. 9 is a flow diagram showing the processing of incoming and outgoing phone system messages into transactional data and the initiation of real-time display of contact entity profiles.

FIG. 9 is a flow diagram 900 demonstrating the processing of phone system 203 messages 901-904 to generate entity profile displays 909, record phone based events into the events table 415 and record phone based transactions into the transactions table 418. The frequency, duration, and disposition of phone calls represent a large portion of personal transactions between the host and its constituent target entities. Target entities can be clients, prospects, vendors, resources, agencies, and even other entities within the host organization. Beyond capturing the statistical and historical records of each target entity's phone calls, the biographical imagery server's 201 capability to immediately display the calling parties' profiles at the initiation of both incoming and outgoing calls adds significant value in assessing and managing the relationship between the host and the target or subject entities.

A primary requisite of integrating phone calls into the biographical imagery server 201 is the presence of a contemporary PBX phone system 203 or similar call logging capabilities. Using caller ID functionality supplied by the host's telephone line carrier, modern phone systems typically offer call logging under either CDR (Call Detail Records) or SMDR (Station Message Detail Recording) with various protocols 905 for communicating the call records to the biographical imagery server 201.

The biographical imagery server 201 responds to call messages it receives from the PBX phone system 203 or any similar system. New and completed call messages 901-904 are received into the biographical imagery server 201 directly from the host PBX phone system 203 using file transfer FTP or other similar communications protocol through a serial port connection or through an IP address. In order to direct the biographical imagery server 201 responses to the correct user monitor, a routing map of telephone exchanges to user workstations along with the current IP addresses of the users' PC's as well as the current browser instance are established. Once identified, the biographical imagery server 201 can direct the responses to the correct host user devices.

Each incoming and outgoing call has a start stage 901, 902 and a completion stage 903, 904. The host PBX phone system 203 sends a formatted phone event message to the biographical imagery server 201 at the start and end of each phone call. The 'starting' or 'new' phone event message issued by the PBX phone system 203 identifies the direction of the call and the initial connecting parties. It is used to identify the calling and called entities, to create temporary entity masters when needed for unidentified callers, and to immediately display the profiles of the callers and their most frequent contacts.

The 'new' phone message does not result in the generation of a phone event or phone transaction but rather qualifies the respective calling parties identities and affects an 'contacts' inquiry to the biographical imagery server 201. The completion, or 'end', phone event message sent to the biographical imagery server 201 contains the start and stop times, the duration time of the call, conclusive connecting parties, and either the default disposition of the call. It does result in the generation of a phone event into the events table 415 and the generation of phone based transaction(s) into the transactions table 418.

The biographical imagery server 201 records new incoming or outgoing phone messages it receives from the PBX phone system 203 into respective call stack tables 906, 914. The biographical imagery server 201 will then determine if the phone number exists as a cross reference in the entity master table 416. If it does not exist, the biographical imagery server 201 will create a temporary entity master 912 for that phone number and will notify 913 the host server 202 that such a temporary entity master has been created so that a valid entity ID can be updated for that temporary entity master. For unidentified entities, a generic profile will be displayed on the biographical imagery server 201 user screen along with the host profile of the entity making or receiving the call.

Entity master maintenance utilities are provided to the users' administrator to update such temporarily assigned entity masters 913. These utilities allow the administrator to assign valid entity identifications 1706 or delete such unidentified entities 1708 and will generate a phone event message that is sent to the biographical imagery server 201 with that directive. If a temporary entity has had events and transactions generated in the interim period, those records are updated 1707 by the biographical imagery server 201 with the assigned entity identification or are otherwise purged 1614 with the deleted entity.

For a valid, identified entity in the entity master table 416, an entity inquiry is executed and a 'contacts view' profile is assembled 907 with the contacts' selected foreground and fascia image masters from the images master table 508 and displayed on the user's screen. For incoming calls, the 'contacts view' displays the profiles of the calling party, the destination party, as well as the profiles of the top four entities whom the calling party has contacted in the past. This automatic response to a new incoming or outgoing phone message is designed to display the target and contact entity profiles 909 on the user's screen is within the first two to three rings before the call is answered, allowing the user to view and determine the status of the target entity before connecting.

The entity profile displays 909 on the 'contacts view' shows which host entities correspond with the calling party most frequently. The profiles in this array are scaled based on the number and duration of previous phone calls with the target entity. This enables the user to redirect the phone call to the most well acquainted host entity or to make an informed disposition of the phone call.

Figure 11:
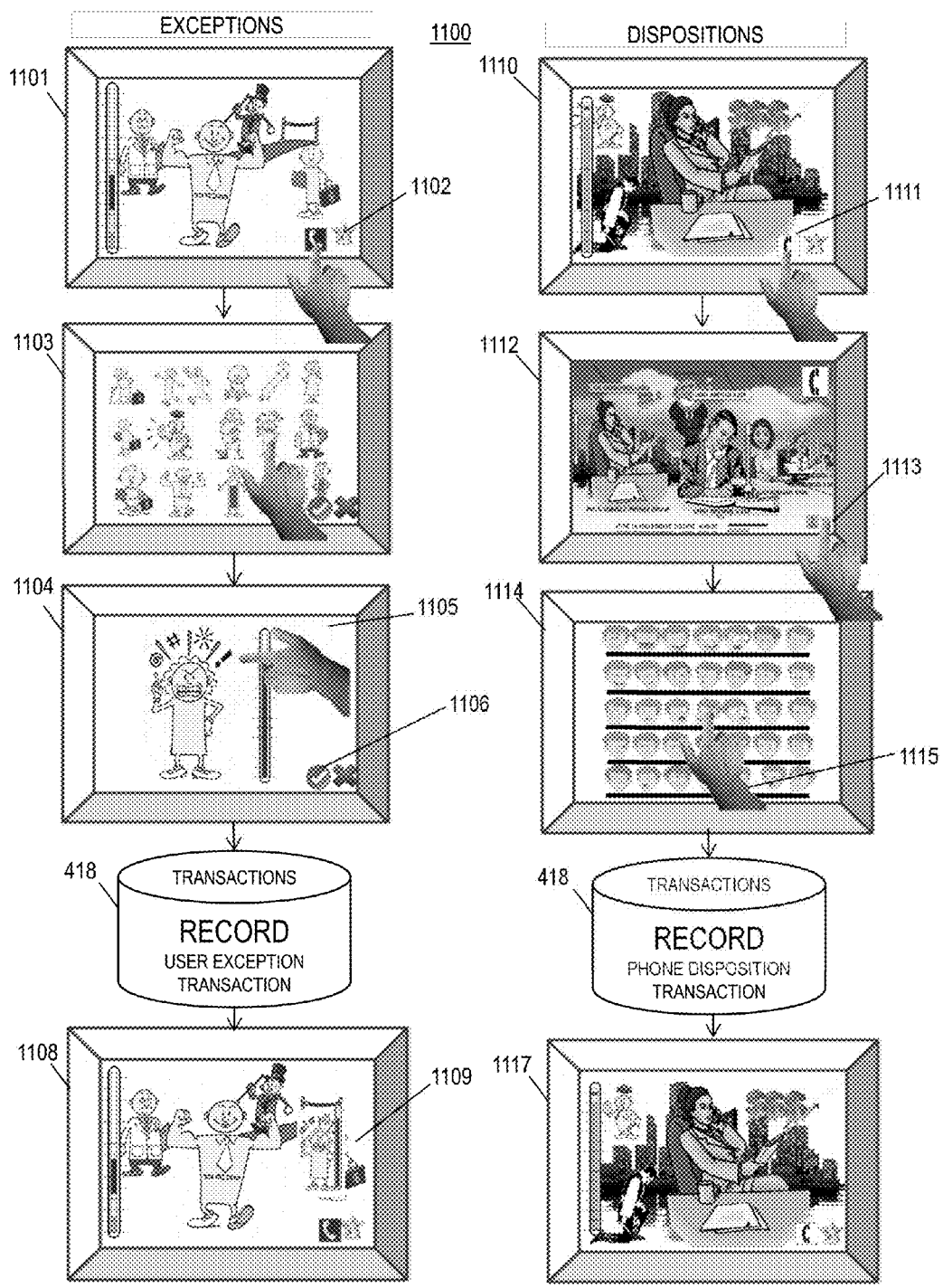
FIG. 11 is a flow diagram showing how the user can select, scale, and record a disposition for the current phone event using touch screen images, how the user can toggle from single entity 'target' profiles to specific group 'contact' profiles for any range of attributes.

FIG. 11 shows how the user can record a 'disposition' for the current or recently completed phone event. For the duration of the phone call and after its completion until another phone call is started, the user may post an 'exception' to record the 'disposition' of the current phone call or to record any other exception they want linked with that phone call. This disposition exception can be posted during or following the 'end' of the phone call. Upon receiving an 'end' message from the host PBX phone system 203, the biographical imagery server 201 will update that phone call in the call stack table 914 as completed. It will then create a completed phone event in the events table 415 that will subsequently post the related transaction(s).

Because, unlike an MIS accounting message that carries a specific event code, no specific attribute is proffered in a phone call event other than its duration and timing, the user interactive screens FIG. 11. Steps 1101-1117 are an important function for classifying that relationship element to an entity's profile. Procedures for 'going back' and updating such dispositions to recently completed but 'unmarked' calls may be provided. Separate exception transactions may also be recorded for the currently displayed entity before the next phone call is processed.

In alignment with the features of the host PBX phone system 203, provision can be made for the optional display of new incoming calls while a current call is still ongoing and incomplete. This would generate a smaller display window with a subset of the new calling entity's target profile displayed. There are PBX features that can identify call-forward exchanges to proxy extensions (i.e., boss to assistant) so that the originally intended contacts are recorded in the transaction file rather than the entity ID of the assistance (proxy) who took the call. Provision has been made to record a third 'operator' entity within an event to reflect the party who 'assigned' or 'handled' and operating event.

Figure 10:
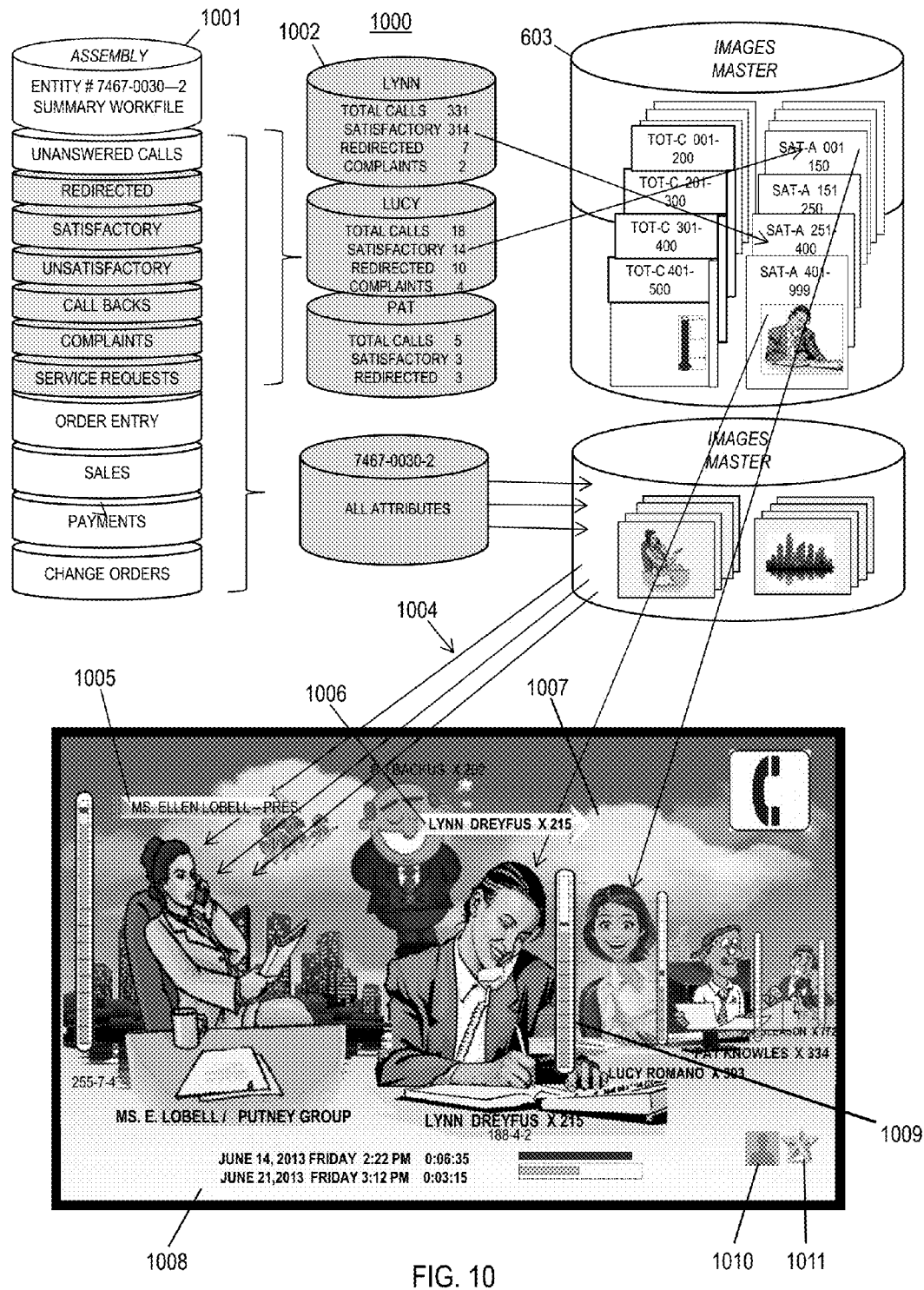
FIG. 10 is a flow diagram demonstrating how the biographical imagery server processes incoming phone call messages received from the host phone system and renders the profiles of both the calling entity along with one or more of the most frequently contacted host entities.

FIG. 10 is a flow diagram demonstrating how the biographical imagery server 201 presents incoming phone call messages received from the host phone system 203 and renders the profiles of both the calling entity along with the three or four most frequent of the host 'contact' entities who have a call history with that client. When a phone number cross references a valid entity master, the biographical imagery server 201 accesses the assembly summary workfile 507 for that client entity and, if needed, reassembles that workfile to assure that it is current.

In the 'contact' format, assembly summary workfile 507 'views' 1001 and 1002 are created in the database for each of the host contact entities who have had historical (transactional) phone contact with the client. The 'phone survey' attribute summaries 1002 are shaded in blue to indicate that they are a 'view' of phone-only attributes. Through the standard assembly and rendering process, it selects the appropriate weighted images from the images master table 508 for the host 'contact' entities based on their individual phone call attributes and, for the target entity selects the appropriate weighted images from the images master table 508 based on attributes 1004. Then, from the respective summary workfile 'views', the biographical imagery server 201 renders the scaled image of each contact in value order along with the target entity profile.

The left side of the screen shows a large green arrow indicating the party 1005 who originated the call. In the middle of the screen is a yellow arrow indicating the party 1006 who received the call. In this case, the target entity originated the call (green) and the host contact received the call (yellow). The right side of the screen 1007 displays the one or more contact entities displayed in most frequent scaled order. The images are scaled to allow the fullest profiles that can fit with both the target entity and the contact entities.

The purpose of this display format is to allow the user to see who most frequently handles the calls for this 'target entity' client. It also shows what other host entities, or 'contacts', have handled calls from this client as a backup to the primary representative. In this example, Lynn Dreyfus has handled 75% of Ms. Lobell's phone calls with the vast majority having satisfactory (green) dispositions and a very small proportion being unresolved (yellow) or unsatisfactory (red). While the biographical imagery server 201 does not necessarily maintain the full identity of the client entities, portraying the name and even faces of the host entities is possible and quickly acquaints new personnel to the staff. This feature ensures that the most familiar party receives the incoming call.

At the bottom of the screen, the direction, date, time, and duration of the last previous and current calls 1008 is shown along with an outline around the current call time representing the average time spent on calls with this client. The volume and resulting disposition of calls sent and received by each contact are shown as color coded rating-bars 1009 next to the target entity's profile and each contact's profile. Each rating-bar displays red, yellow, and green measures for unsatisfactory, unresolved, and favorably resolved dispositions on events with the target entity. These reflect events within the attribute 'survey' range being displayed. At any time, the user can click or point to the 'profile' icon 1010 to expand the client profile to full screen with full attribute displays and drill down capabilities.

During the incoming or outgoing call completion process, the user may also select the 'disposition' icon 1011 to identify the content or conclusion of the phone call.

FIG. 11 shows how the user can interact with the biographical imagery server 201 display to record exception or disposition transactions 1100. By touching the exception star 1102 on the entity relationship profile screen 1101, a sub menu of various exception and phone call disposition icons 1103 is displayed. The user may then select the relevant icon which is then displayed in full scale 1104 along with a rating-scale with which the user can indicate the intensity 1105 of that disposition or exception.

When complete, the user touches the 'OK' checkmark icon 1106 and, following affirmation by the user, the exception transaction is recorded in the transactions table 418. That exception transaction is then processed into the entity relationship profile and the entity relationship profile is redisplayed 1108. Subject to rendering priority placement on the image plane, that exception icon and its associated rating scale 1109 is displayed as part of the entity relationship profile.

The biographical imagery server 201 offers two views of the entity relationship profile. The 'target' view 1110 uses the full screen to show as much information as possible about the target entity and will utilize all of the sectors in the background, midground, foreground, and fascia layers to assert as many attributes in as large scale as possible.

By selecting the 'contacts' view icon 1111, the user directs the biographical imagery server 201 to switch the display to the 'contacts' view 1112, showing the target entity and each of its most frequent host contacts. This is the same view presented with a new call to or from the target entity. The 'contacts' view 1112, which is automatically invoked for new incoming and outgoing phone call events, applies the 'contacts' format and scales the images to allow the fullest profiles that can fit both the host contact entities and the target entities.

The user can enter exceptions or current phone call dispositions from the 'contacts' view as desired by selecting the exception button 1113. The phone call disposition screen 1114 provides the user with a way to record the status or 'disposition' of the phone call by selecting from a series of icons. These dispositions icons, like other images in the user repertoire, are engineered to reflect the manner of business. Each disposition icon is associated with a specific attribute that records the resulting transaction when the call is completed. The dispositions are arrayed in rows with color highlights that reflect favorable to unfavorable (blue/green/yellow/orange/red) disposition status. After the disposition selection 1115 is confirmed, the contacts screen is restored pending call completion. Upon completion of the call, the transaction is recorded in the transactions table 418 with the final call statistics and the original target or contact screen is restored 1117.

Figure 12:
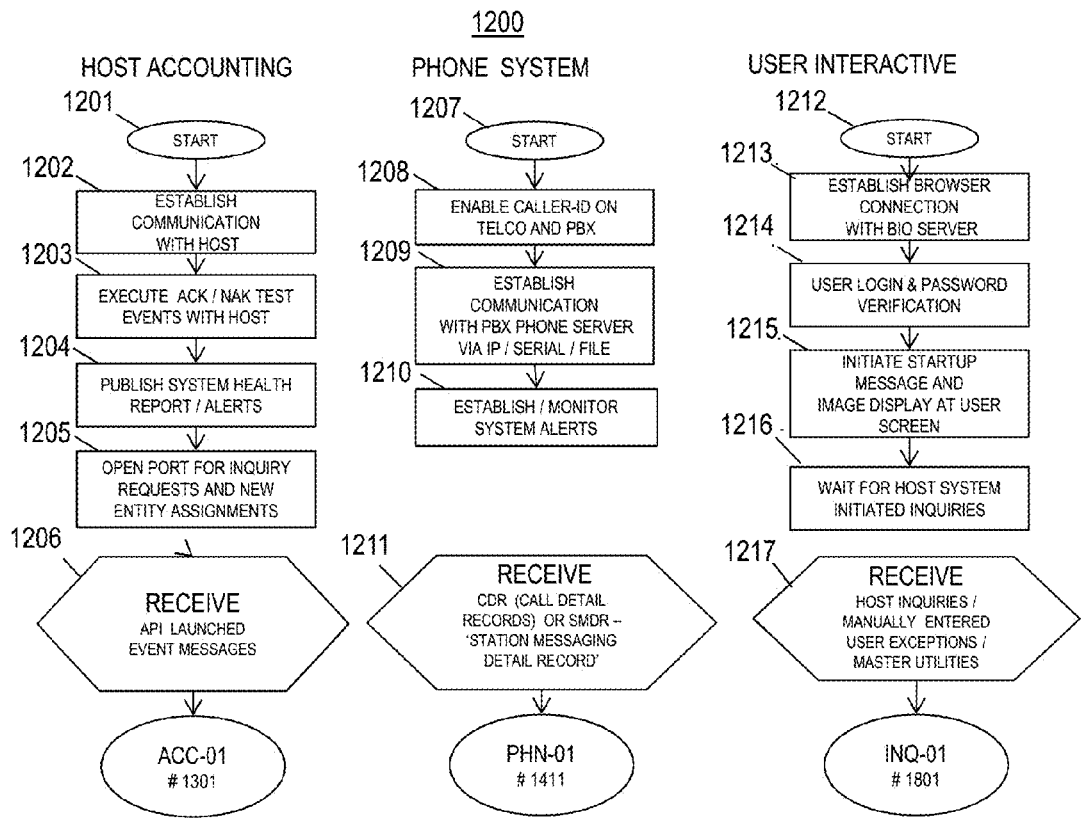
FIG. 12 is a flowchart of the connection and communication methods employed by the biographical imagery server to obtain event messages from the three primary host event sources and for user maintenance of master tables.

FIG. 12 is a flowchart showing the connection and communication methods performed by the biographical imagery server 201 for the respective host event sources. There are three communication methods 1200 established through which the biographical imagery server 201 can receive, and respond to, various event message types for event initiation. Each communication method requires specific initial and continuing connection protocols. All communication methods are dynamic and assume a continuing on-line connection with the biographical imagery server 201.

The first communication method 1201 is performed by the biographical imagery server 201 with respect to the host MIS/accounting source. The event messages sent from the host API are prepared in the format prescribed in the database tables. Industry standard FTP or similar message exchange protocols may be used for the initial handshake and acknowledgement testing 1202, 1203. The biographical imagery server 201 employs adequate health check functions in step 1204 to assure the high reliability for the other communication connections. The image processing server maintains an open port in step 1205 to receive event messages from the host server 202.

Biographical imagery server 201 API (Application Programming Interface) 402 or database triggers are embedded at various points in the host MIS system to generate relevant event messages from the host's accounting and related operations. This data capture focuses on validated postings to the host general ledger and may be limited to non-corporate, client-based activities. The biographical imagery server 201 may be conditioned to receive and acknowledge event message transmissions from the host server 202 at any time 1206.

The second communication method 1207 is performed by the biographical imagery server 201 with respect to the host phone system 203. The host phone system 203 utilizes a direct serial connection 1209 to pass phone call data to the biographical imagery server 201. Caller ID is enabled with the host phone system 203 through the host's Telco line carrier 1208. While the host phone system 203 typically does not offer as much conventional programmability for health check processing as do host server 202 environments, adequate monitoring, and system alerts are established in step 1210 to assure that all generated events are received and processed. The biographical imagery server 201 is conditioned to receive and acknowledge event message serial transmissions from the host phone system 203 at any time 1211.

The third communication method 1212 is performed by the biographical imagery server 201 with respect to the user interactive source in steps 1213-1217. The user interactive source uses standard internet or intranet connections and browser protocol 1213 to communicate with the biographical imagery server 201. The biographical imagery server 201 requires a valid user login and password 1214 to complete the connection. Upon connection, the biographical imagery server 201 displays a startup page 1215 and awaits further entity displays initiated by the host MIS or phone system 203 sources 1216. The biographical imagery server 201 also anticipates user-initiated exception transactions and limited screen navigation commands directly through touch screen or mouse point and click 1217.

Figure 13:
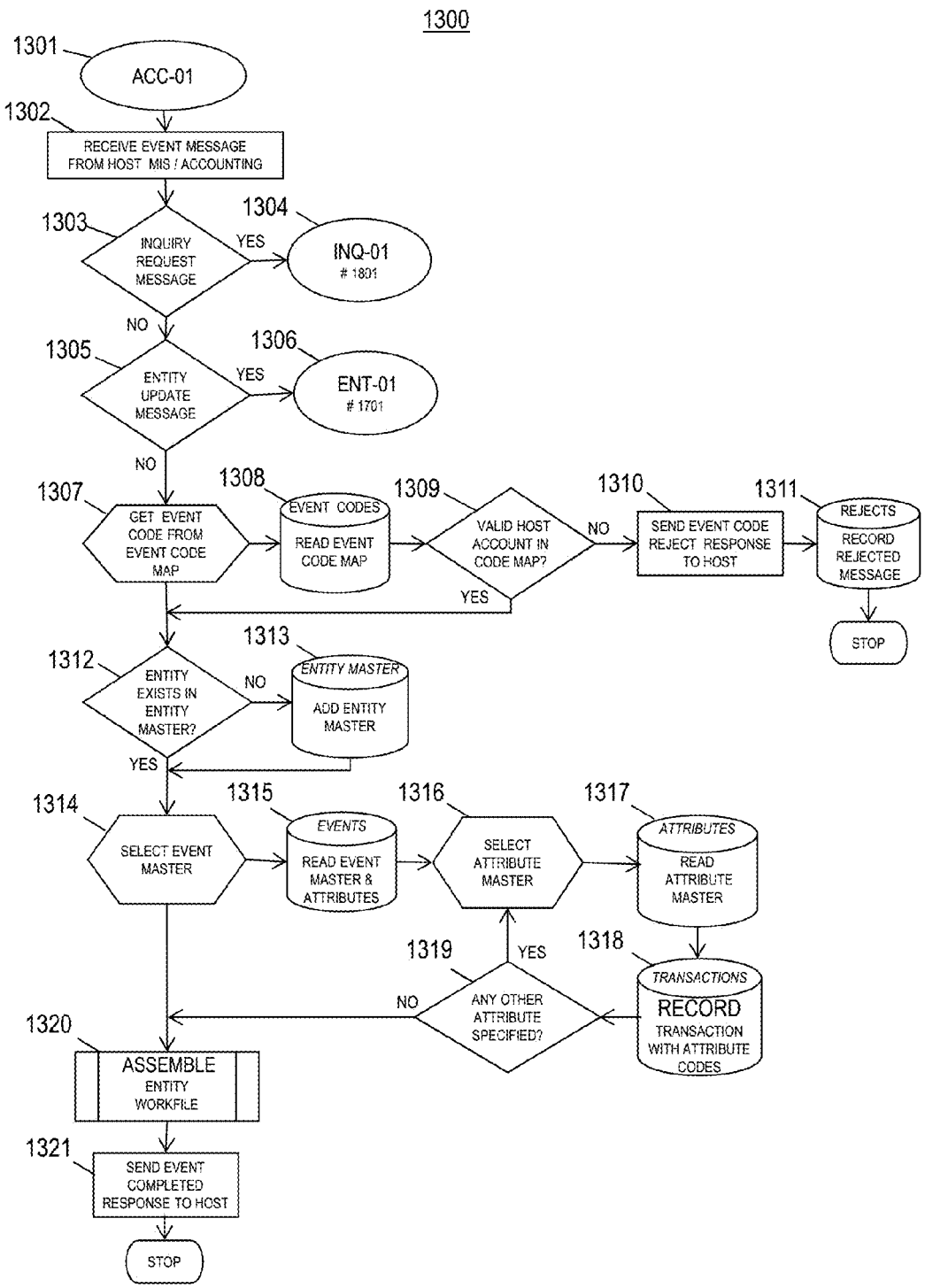
FIG. 13 is a flowchart showing a method for capturing host MIS/accounting events and generating related transactions according to an embodiment of the present disclosure.

FIG. 13 is a flowchart showing a method 1300 of capturing host MIS/accounting events, generating the related transactions, and storing them in the biographical imagery server's 201 transactions table 418. In step 1201-1206, the host MIS/accounting server generates event messages and transmits them to the imaging server through an API or similar daemon processes running as embedded processes within the host general ledger operations, host inquiry operations, and interactively to initiate entity profile requests. These daemon processes run continuously and monitor activity of certain functions of the host server 202 applications or databases. The function of the daemon processes is to transmit event and service request messages to the biographical imagery server 201.

Step 1301 represents the biographical imagery server's pending 'receive' status from the host system's API message transmitter. The biographical imagery server 201 receives the event messages in step 1302. The biographical imagery server 201 processes these event messages and reports back to the host system 202 indicating they have been completed or rejected 1301-1321. There are two types of event messages that the host MIS system issues to the biographical imagery server 201: service messages and data messages. The service messages request the biographical imagery server 201 to perform inquiries in parallel with the host operations so that the corresponding entity relationship profiles are displayed in tandem with host's entity displays. For example, if the biographical imagery server 201 recognizes an inquiry request message in step 1303, in step 1304 the biographical imagery server 201 performs the method 1800 of FIG. 18.

The data messages include entity updates and MIS/accounting events. The entity updates are issued by the host in response to the creation of temporary entity master entries that do not have validated ID codes or are missing basic demographic data such as a cross reference phone number to which incoming phone numbers can be matched. When the biographical imagery server 201 receives an entity update message in step 1305, in step 1306 the biographical imagery server 201 performs the method 1700 of FIG. 17.

In step 1307, the biographical imagery server 201 determines whether an event message has a valid host account code by determining whether these codes exist 1308 in the biographical imagery server's 201 event code map 414 table. The event code map 414 table cross references the native host account codes with their destination event codes in the biographical imagery server's 201 event master table 417. If, in step 1309, the application determines that there is no entry in the table for the host account code in the event message, a message corresponding to the invalid event message is returned to the host server 202 in step 1310 and the event message is written to a reject table in step 1311.

While the host may elect to provide an initial conversion table for their MIS/accounting entities, new entities can be generated automatically by the biographical imagery server 201 whenever a new entity ID is received in an event message. In step 1312, the biographical imagery server 201 determines whether the entity identified by the entity ID in the event message is a new entity by comparing the entity ID to the entity ID's in the entity master table 416. If the entity ID is a new entity ID, the biographical imagery server 201 creates an entity master entry and adds it to the entity master table 416 in step 1313.

Since the biographical imagery server 201 can assume that any entity ID code received directly from the host MIS system is valid, the biographical imagery server 201 can create its counterpart entity master entry using the entity ID in the event message. The event messages are defined to include certain demographic data such as the entity's phone number and primary location as well as the host's internal location/classification codes for the entity. The demographic data is used to group entities when performing location searches or generating comparative views of the entities.

In step 1314, an event master corresponding to the event code found in the event code map 414 by using the host account is selected from the event master table 417. The event master entry may indicate one to four attribute codes. For each attribute code specified in the event master 1316, the attribute master is read 1317 and all of the image positioning, and weighing factors are recorded 1318 into a separate transaction record in the transactions table 418. After recording the transaction records for each of the specified attribute codes 1319, the biographical imagery server 201 then assembles the entity's transaction history into a summary workfile 1320 so that inquiries can be rapidly serviced upon request. As part of the communications protocol, the biographical imagery server 201 may then send a 'completed event' message back to the host MIS server in step 1321.

Figure 14:
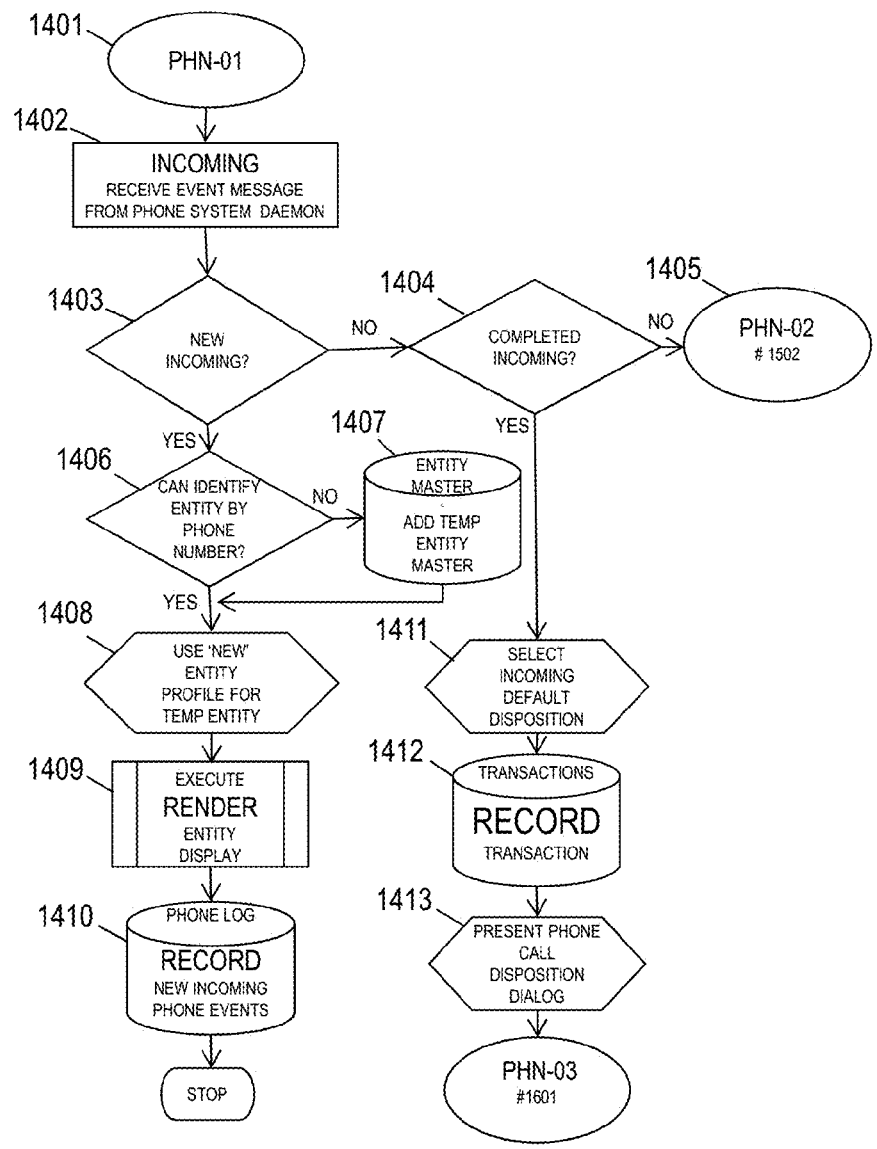
FIG. 14 is a flowchart showing a method for capturing incoming phone call messages generated from the host phone system according to an embodiment of the present disclosure.

FIG. 14 is a flowchart of a method for capturing incoming phone call events 1400 generated by the host phone system 203. Phone calls represent a significant portion of an entity's activities with the host and in an entity's relationship profile. The host phone PBX or similar phone system 203 generates two event messages for every incoming and outgoing phone call, one at the start of each 'new' call and another at the completion of each call. While 'new' incoming and outgoing call messages cause the biographical imagery server 201 to render 'contact' profiles of the calling parties and their most frequent contacts, these 'new' calls are not recorded as transactions. Only 'completed' incoming and outgoing calls with all the final details of the calls generate transaction records.

Step 1401 represents the biographical imagery server's pending 'receive' status from the PBX phone system's 203 serial port. In step 1402, the biographical imagery server 201 receives a phone event message generated by the host's phone system 203 which specifies the caller's phone number. If the incoming call is a new incoming call 1403, the caller's phone number is cross referenced to the entity master table 416 to locate the primary entity ID corresponding to the caller's phone number, 1406. The entity ID is the native code assigned by the host's MIS system. If the phone number cannot be validated, the biographical imagery server 201 creates a temporary entity master entry and records it in the entity master table 416, in step 1407. The temporary entity master entry may include a temporary entity ID that is assigned to the caller entity.

The biographical imagery server 201 assigns such temporary entity masters for unidentified entities because new entities are frequently introduced to the host system 202 through the phone system 203. Unidentified 'new' incoming callers with a temporary entity ID have their calls recorded 1412 in the transactions table 418 when completed so that future calls from that number can be displayed and recognized as a repeat unsolicited entity. In step 1408, the biographical imagery server 201 uses a new entity ID to render the profile for the temporary entity master entry.

In step 1409, the biographical imagery server 201 then renders an entity display based on the entity relationship profile for the existing, validated entity or for the temporary new entity. The rendering process checks to determine whether a fresh assembly needs to be performed on the entity's transaction history and executes the assembly process if needed. For 'new' incoming calls, the rendering process ends with a phone event message being recorded in the phone log table in step 1410.

When an incoming call is completed, the PBX phone system 203 sends a second phone event message in step 1402 indicating the end time of the call, duration of the call, and the entity ID's of the calling parties. Multiple conference call participants and subsequent multiple contact transaction recording may be accommodated depending on how such multi-party calls are communicated by the PBX phone system 203. Only completed call messages are recorded as phone call transactions.

When the biographical imagery server 201 recognizes a completed incoming call message 1404, the transaction is immediately recorded into the transactions table 418 for that entity using that default disposition (satisfactory) attribute code 1411, but can be then electively updated by the user to apply a different disposition. After recording 1412 the initial transaction, the phone call disposition dialog screen is displayed 1413 and the user is prompted to select any of the alternate incoming phone call disposition icons. If the phone message is not recognized as either a new incoming or a completed incoming call, the outgoing call process is followed 1405.

Figure 15:
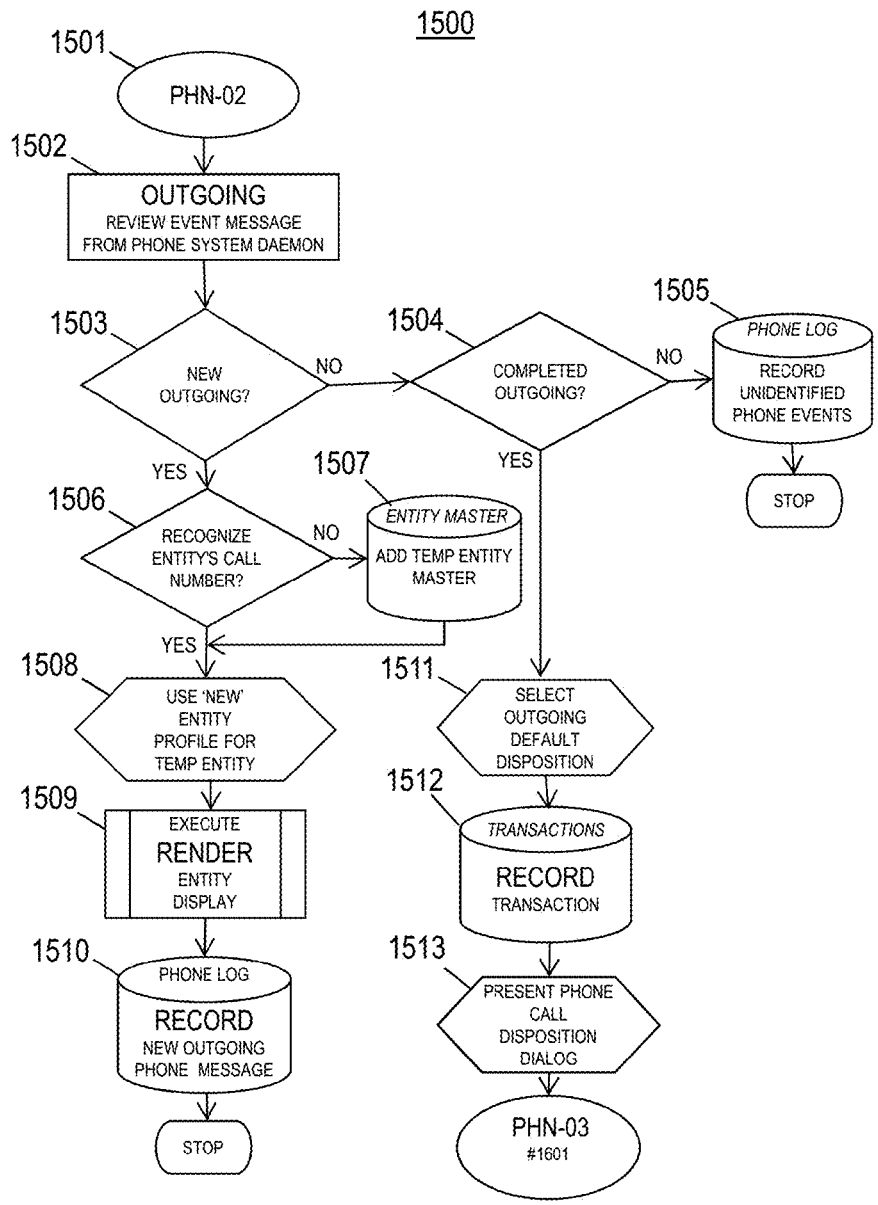
FIG. 15 is a flowchart showing a method of capturing outgoing phone call events generated by the host phone system according to an embodiment of the present disclosure.

FIG. 15 is a flowchart showing a method 1500 for capturing outgoing phone call events generated by the host phone system 203. Steps 1501 and 1502 show the recognition of the phone call message from the PBX phone system 203 as not being an incoming call and being forwarded for outgoing call processing. If the phone message is not recognized 1505 as a valid outgoing call message, it is logged as an unidentified call type in the phone log table 412 for later examination and resolution by the system administrator.

For 'new' outgoing calls 1503, as with 'new' incoming calls, the called phone number is cross referenced to the entity master table 416 to locate the primary entity ID in step 1506. If the phone number cannot be validated, a temporary entity ID is assigned to the called entity. The biographical imagery server 201 similarly displays the contact profiles with up to four host contact entities that most frequently speak with the called entity (FIG. 10), the duration, and the typical dispositions of those calls. These profile displays on both incoming and outgoing new calls are intended to alert the caller to current relationship issues (e.g., warnings, reminders, expirations, discounts, etc.) to which they might otherwise not be aware.

Whether for an existing, validated entity or for a temporary new entity 1508, the entity relationship profile rendered reflects that entity's assembled transaction summary workfile. Each such rendering process 1509 checks to determine if a fresh assembly needs to be performed on the entity's transaction history and executes such assembly as needed. For outgoing new calls, the rendering process ends with the phone event message being recorded into the phone log table 412 in step 1510.

When an outgoing call is completed, the PBX phone system 203 sends a second phone event message for that call indicating the end time of the call, duration of the call, and the entity IDs of the calling parties 1504. Only completed call messages are recorded as phone call transactions. An initial 'neutral disposition' event code (e.g., a call is satisfactorily completed) is defaulted 1511 as the disposition attribute code of the completed outgoing phone transaction. The transaction is immediately recorded 1512 into the transactions table 418 for that entity using that default disposition's attribute code, but can be then electively updated by the user to apply a different disposition. After recording the initial transaction, the phone call disposition dialog screen 1513 is displayed and the user is invited to select any of the alternate phone call disposition icons.

Figure 16:
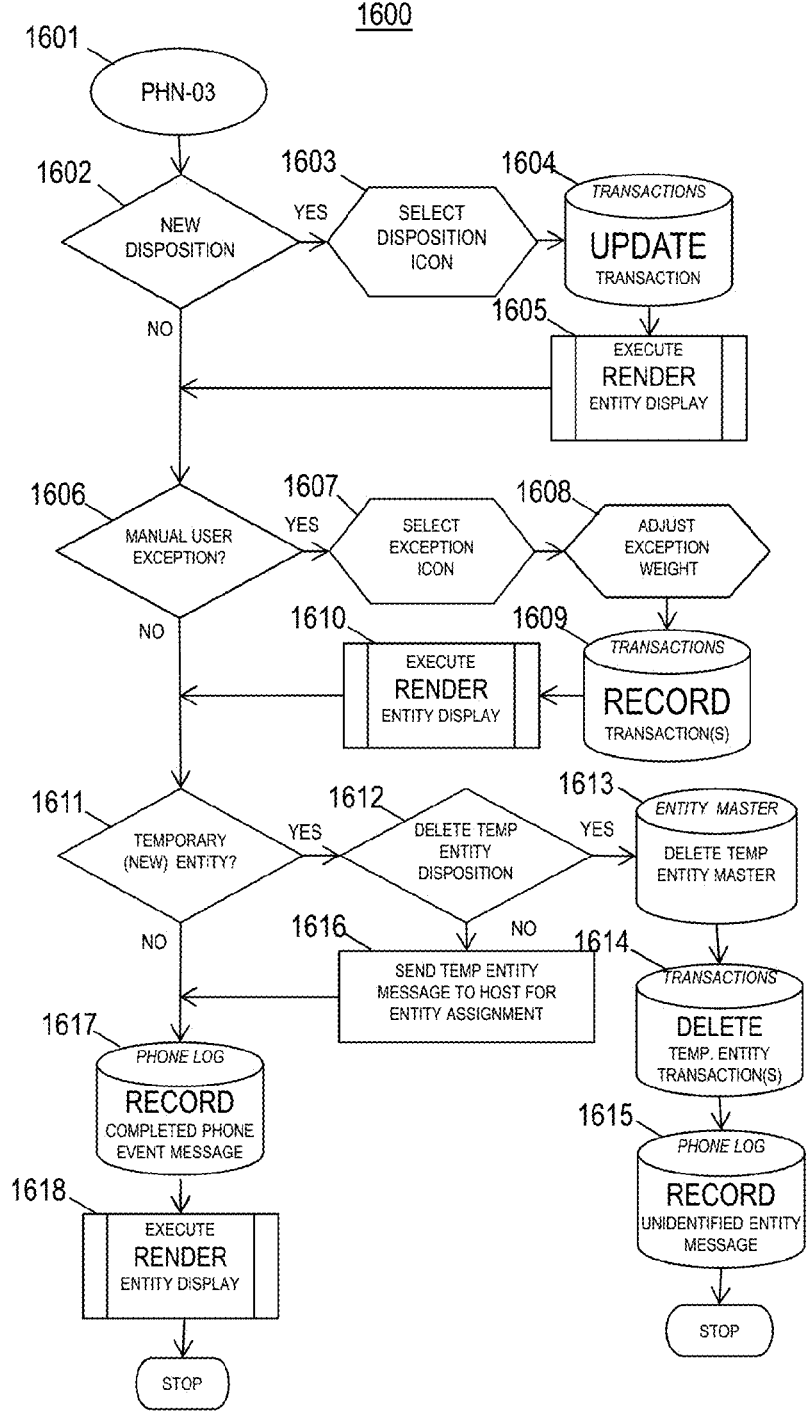
FIG. 16 is a flowchart showing a method for the common processing of both completed incoming and completed outgoing phone call events generated by the host phone system in recording transactional records of the calls.

FIG. 16 is a flowchart showing a method 1600 for the common processing 1601 of both completed incoming and completed outgoing phone call events generated by the host phone system 203 and transmitted to the biographical imagery server 201. Should the user elect to modify the call disposition of the completed phone event in step 1602, the disposition survey screen is displayed 1603, and the initial transaction is updated in the transactions table 418 with that selected disposition's attribute code 1604 upon confirmation by the user. To see what affect, if any, the user's disposition selection may have on the entity's profile, the profile is re-rendered in step 1605 after each such change. The more definitively each such call disposition is selected by the user, the more precisely the overall entity relationship profile can be expressed.

The standard exception selection icon (star) appears after the disposition screen is replaced with the re-rendered profile. Exceptions may also be posted 1606 in addition to the phone call disposition to further record any significant issues associated with the phone call. Steps 1607, 1608, and 1609 reflect the user's selection, scaling, and recording of new exception transactions into the transactions table 418. The profile is again re-rendered after any user exception posting in step 1610.

In case a temporary entity ID has been assigned to an unidentified phone caller 1611, the user may determine that the host does not want to retain a relationship with that entity and may elect 1612 to delete the temporary entity. If so elected, the biographical imagery server 201 deletes the temporary entity from the entity table 416 in step 1613, deletes any transactions generated for the temporary entity in step 1614, and records the phone call event message as an unidentified entity in step 1615. The image screen will be cleared and the biographical imagery server 201 will wait for the next event message.

Figure 18:
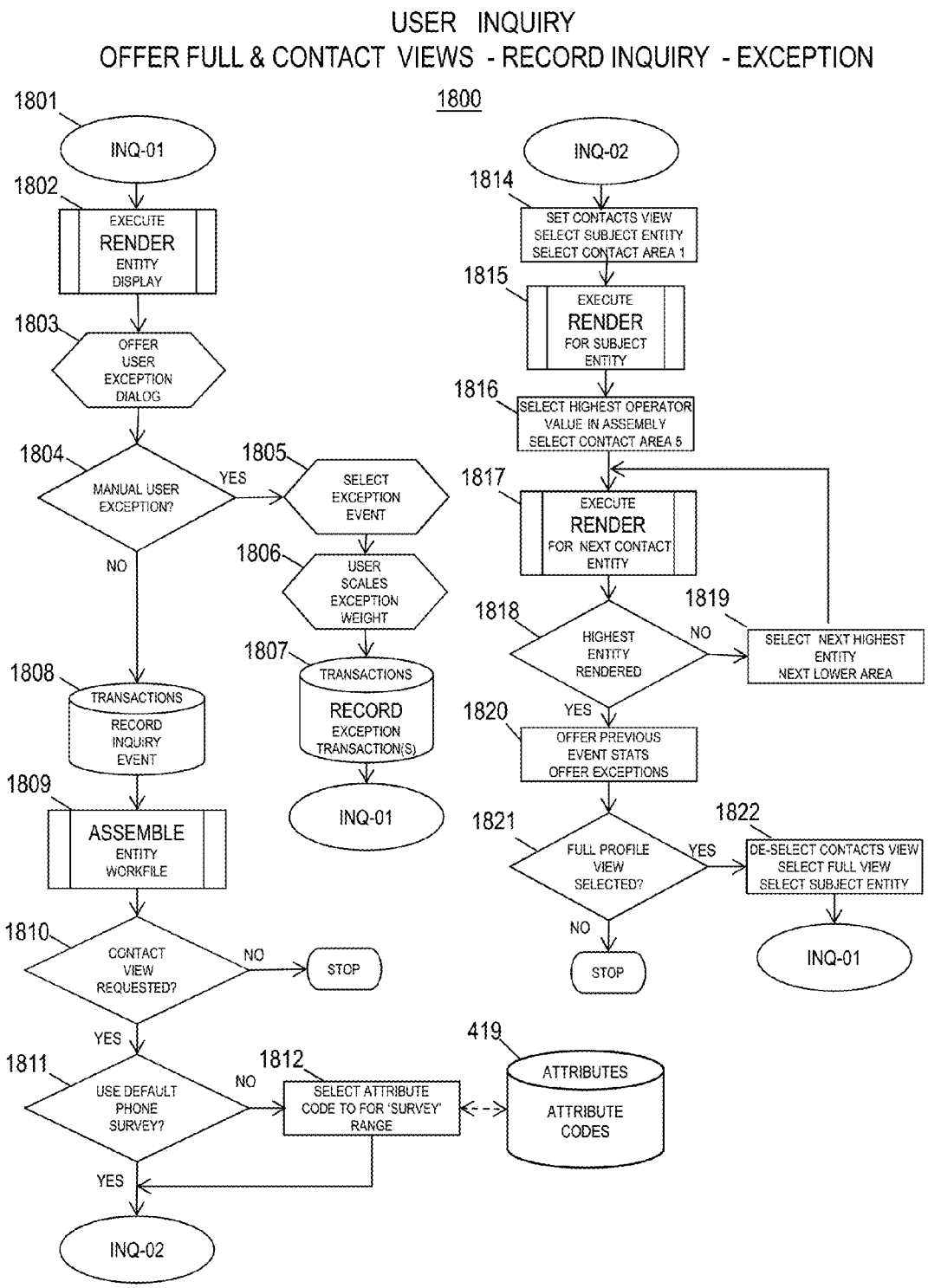
FIG. 18 is a flowchart showing a method for processing inquiry event messages transmitted from the host MIS/accounting system to the biographical imagery server.

If the temporary entity is to be kept for permanent assignment, a response message 1616 which indicates that the biographical imagery server 201 is awaiting the assignment of a permanent host ID to that temporary entity is generated by the biographical imagery server 201 and transmitted to the host server 202. FIG. 18 shows how the biographical imagery server 201 handles the forthcoming entity assignment from the host server 202.

After all disposition and exception user interface events are completed, the phone event message is recorded 1617 in the phone log table 412 to provide an audit trail and the final rendering of the entity relationship profile is processed 1618, providing a fresh assembly for any new inquiry requests. The current entity relationship profile screen will be displaced by new incoming or outgoing phone call message profile renderings or other event message responses.

Figure 17:
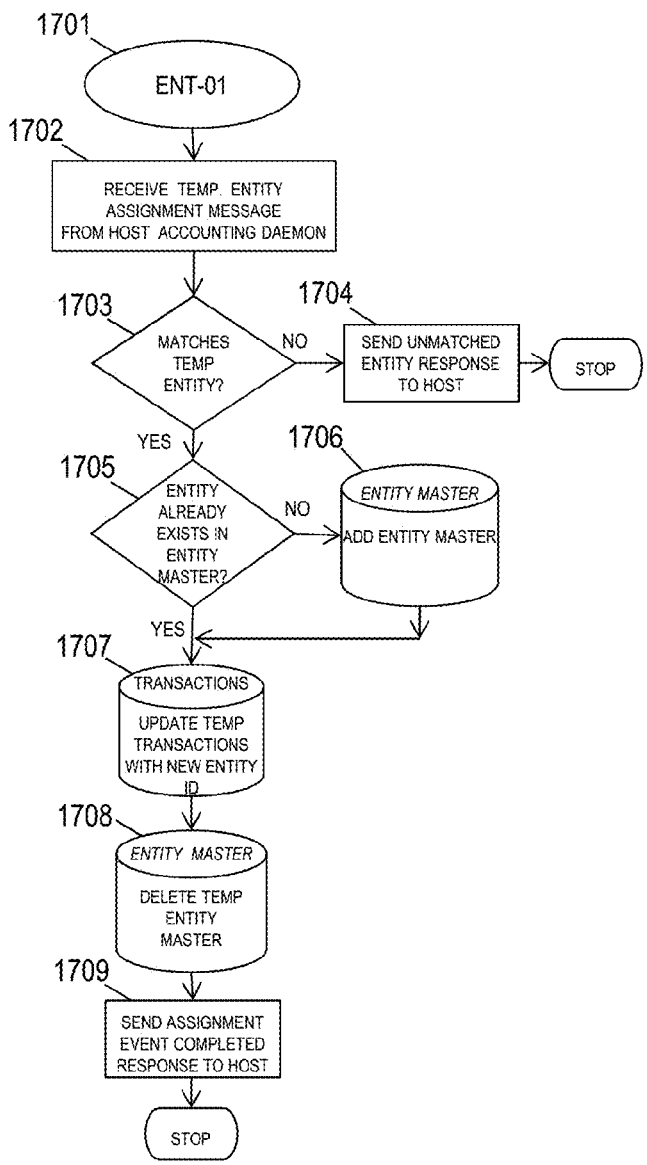
FIG. 17 is a flowchart showing a method for processing entity assignment and update event messages transmitted from the host system to the biographical imagery server.

FIG. 17 is a flowchart showing the processing of entity assignment event messages transmitted from the host server 202 to the biographical imagery server 201. Step 1701 shows the entry point to the entity assignment message process from the inquiry message receipt process that has recognized an entity update message. During the processing of phone call event messages, when an unidentified phone number is received that does not cross reference to an entity master with that phone number, a temporary entity master is created for the purpose of recording that phone call transaction in steps 1407 and 1507 of FIGS. 14 and 15, respectively. The host server 202 is notified of this temporary entity creation by being sent a message 1616 from the biographical imagery server 201 indicating the phone number and temporary entity ID for which a temporary entity has been created.

In response to the biographical imagery server 201 to host message, the host system 202 returns an entity assignment event message to the biographical imagery server 201 that contains a valid host entity ID number to be used for that entity 1702. If the phone number in the received event message does not match 1703 any of the phone numbers in the temporary entity table in the biographical imagery server 201, a biographical imagery server 201 to host message is sent 1704 to the host system 202 indicating that no such phone number exists for in the temporary entity table.

If the phone number does exist in the temporary entity table, the biographical imagery server 201 determines in step 1705 whether the entity assigned in the entity assignment event message already exists in the entity master table 416. If it does not exist, the biographical imagery server 201 adds the assigned entity master entry to that table 1706 including the original phone number of the temporary entity along with any of the provided demographic locale, email, description, and other data supplied in the entity assignment message.

Since transactions may have been recorded for the temporarily assigned entity, those transactions in the transactions table 418 are updated with the host system 202 new entity ID code 1707. The temporary entity master is also then deleted from the entity master table 416 to direct any new phone call events to the new entity ID 1708. Upon completion of processing of the new entity assignment event message, a completed message of that type is transmitted to the host system 202 in step 1709.

Periodically, the user and biographical imagery server 201 engineer review the entity master table 416 for unresolved temporary entity master entries. An interactive utility application is provided in the PC workstation to allow the user to manually resolve unassigned temporary entity master entries and for other master table maintenance.

FIG. 18 is a flowchart showing a method 1800 for the processing of inquiry event messages transmitted from the host MIS/accounting system to the biographical imagery server 201. Inquiry event messages are generated from strategic points within the host MIS system where account inquiries are executed as part of the standard operations of the host MIS system. The inquiry event messages are generated and transmitted to the biographical imagery server 201 from embedded API's and/or from triggers in the database where accounting and other client relevant functions are recorded.

The primary function of the inquiry event message is to display the entity relationship profile of the target entity. When that inquiry message is received by the biographical imagery server 201, the transaction histories of the target entity are assembled and rendered on the user screen in step 1802. The inquiry message invokes two distinct processes for presenting the entity relationship profile: the assembly process, which is shown in FIG. 20, and the rendering process, which is shown in FIG. 19.

The assembly process summarizes the entity's transaction history into an assembly summary workfile 507 based on attribute codes. It applies ageing and retention rules to the entity's transaction history during the assembly process. If a transaction's original effective date is past an attribute's retention date, that transaction is ignored and is subsequently purged during periodic file maintenance. For current and consolidated transactions, their quantity and count values are adjusted based on ageing and acceleration parameters inherited from their respective attribute masters.

Figure 19:
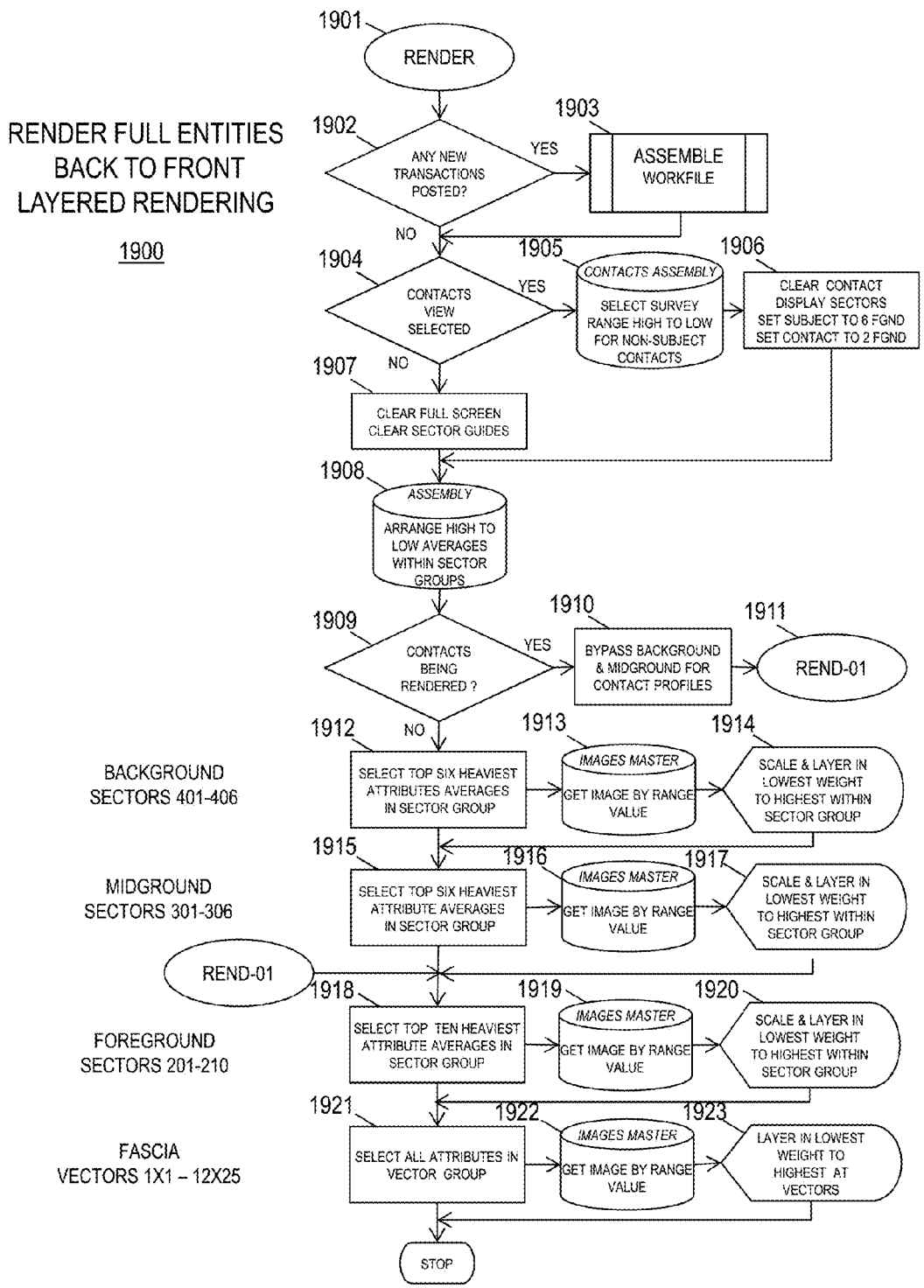
FIG. 19 is a flowchart showing a method for rendering a composite scene and determining the priority of displaying the layers and sectors of contending attribute images of the target and contact entities within those layers.
Figure 20:
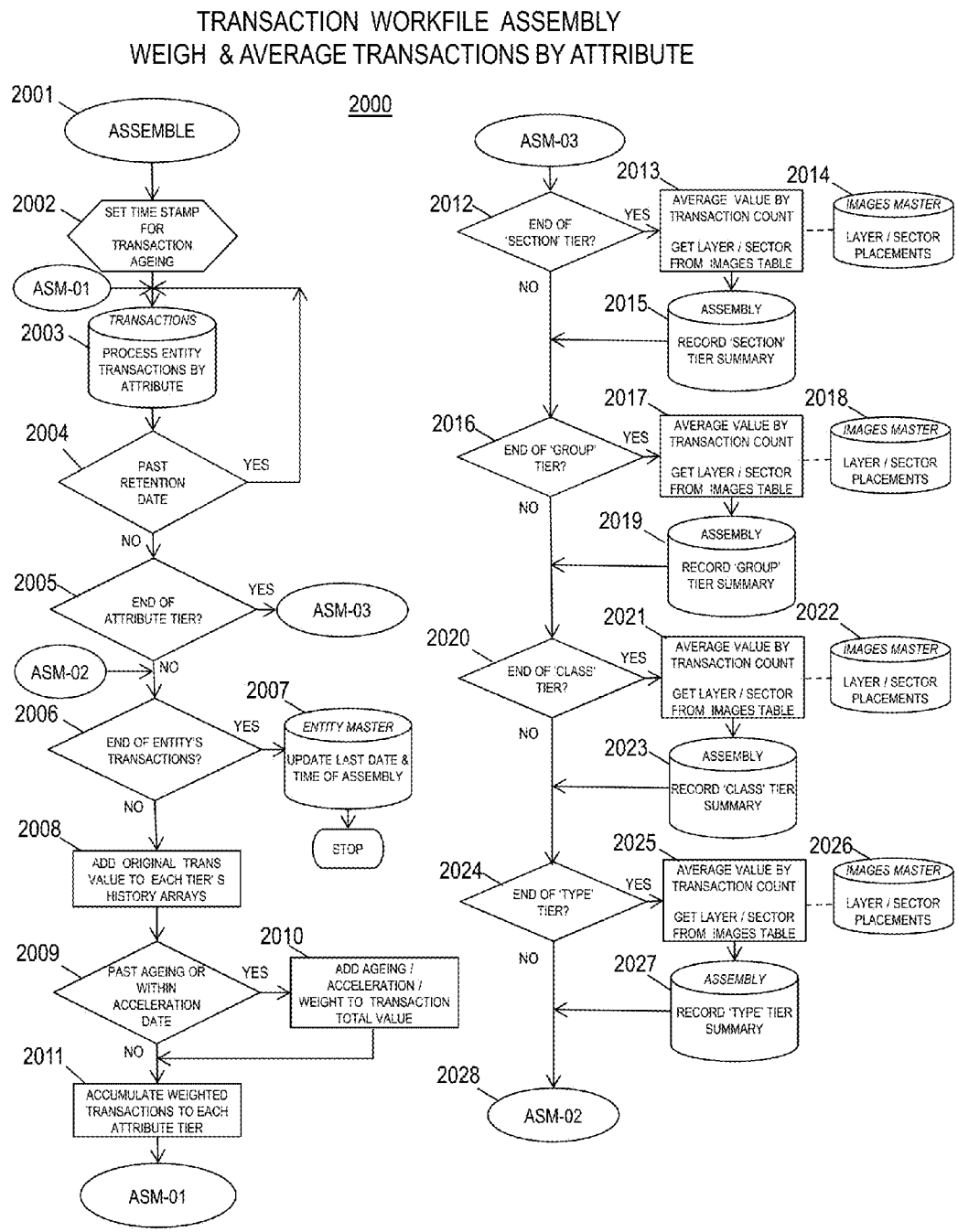
FIG. 20 is a flowchart illustrating a method for the assembly function of the biographical imagery server that aggregates, ages, weighs, accumulates, and arrays the history of all of the transactions into attribute summaries of the target entity and of its contact entities so that they can be rendered on the user screen.

The rendering and assembly processes shown in FIGS. 19 and 20 use the transaction summaries in the assembly summary workfile 507 to organize and display the attribute images. The rendering process checks the entity master table 416 control record to ensure that the assembly summary workfile 507 reflects all of the recently posted transactions. In the biographical imagery server 201 database, the various sorting processes are often achieved by defining specific 'views' of the database and do not necessarily reflect sorts or other data manipulation as may be described for workflow explanations. The assembly process is executed after each transaction is added to the target entity so that the user does not have to wait for that process to be run before the associated image can be rendered.

The inquiry event message invokes the rendering process in step 1802 and then offers the user to post exception transactions by displaying the exception icon in step 1803. If the exception icon is selected 1804, the biographical imagery server 201 displays one or more exception menus which reflect the nature of the host business and allows the user to select the relevant icon 1805. The user then adjusts the scale of that exception to the desired measure of intensity 1806, after which the exception is recorded 1807 into the transactions table 418 and the inquiry process 1801 is rerun to include the current exception.

When there are no further exceptions to be posted following the last rendering, the current inquiry event, which also represents an event with that entity, is recorded as a transaction 1808 in the transactions table 418. Because the volume of inquiry transactions may be an indication of certain volatility associated with the entity, each inquiry is recorded as a transaction. Following the posting of the inquiry transaction, the biographical imagery server 201 again assembles the entity's transactions in step 1809 to prepare that entity for forthcoming inquiries.

The entity relationship profile or inquiry screen displays a selectable icon representing the 'contact view' inquiry format in step 1810. By default, the contacts view format is used for phone call events to show the profile of the entity who is calling or is being called. The contact view shows the top four 'contact' host entities and the top three 'liaison' host entities who have had contact with the target entity based on phone and correspondence histories. This format uses a split screen which limits the number of attribute images that can be rendered for the host entities, but scales the contact and liaison images in size to the volume and frequency of phone time and instances they have had contact with the target entity. This format also shows a synopsis of the disposition of those calls in the form of color coded rating-scales 1009 for each of the contacts. The target entity profile is rendered with the top six foreground and top two midground layers it invokes, but at a smaller size. The target entity also display a rating scale similarly based the 'survey' transaction history. The background layers reflect the 'survey' attributes' own background layers to reflect that trade or theatre of inquiry.

If selected, the 'contacts view' offers the client the alternate selection of a specific attribute 'survey' 1811 range against which to assemble and display their most active entity contacts. Because the attribute table 419 is arranged in a tiered, hierarchal format ('section', 'group', 'class', and 'type'), the user can electively 'survey' a trade or other work group and view the top contacts who have had the most work with them or with another entity. The rating-scale display also gives a synopsis of what the record of disposition has been for those events.

If the current entity profile has been automatically invoked due to a 'new' phone call event, the 'phone call' attribute 'survey' 1811 is defaulted and displayed. If the 'contacts' icon has been selected on the target profile inquiry, the attribute 'survey' option 1812 is offered. While the contacts view uses similar processes as the target entity profile to assemble and render the contact profiles, the contact view profiles may be limited to only the 'survey' attribute(s) and may also be limited to events that have occurred with the target entity.

The scaling and positioning of profiles on the screen for the contacts view is necessarily different from the target view. The display area for the target entity profile is reduced to the left one-third of the screen, although this limitation is dependent upon monitor size, and its display is limited to six foreground sectors, and two midground sectors. The full fascia layer is still fully displayed for all the entities. The sectors for the contacts and liaisons profiles are in fixed positions with graduated scaled display positions. Their placement in these positions is based on their total value scores in the selected attribute 'survey'.

The contacts view renders the target entity first 1814, 1815 and then renders the top three liaison profiles followed by the top four contacts profiles in lowest 'survey' value to highest 'survey' value order 1816-1819 so that the more prolific contacts receive the foremost displays. Each liaison and contact profile has their two highest value foreground attributes displayed below their full fascia layer. By clicking on the respective contact images, the user may move the contact up to the highest position with their two latest event dates and dispositions displayed at the bottom of the screen 1820. Whenever the contacts view is rendered for the user, the target profile icon is displayed in step 1821 to allow the user to switch to the fuller format 1822 as desired.

FIG. 19 is a flowchart showing a method 1900 for determining the priority of displaying the layers and sectors of contending attribute images of the target entity within those layers and displaying those prioritized images on the user's screen. Step 1901 represents the point at which the other processes invoke the rendering process. To ensure that no recent transaction is omitted from the current rendering, the biographical imagery server 201 checks the target entity's latest posting date in the entity master table 416 against the assembly date in the assembly summary workfile 507 to see if any new transactions have been added to the target entity's transaction history 1902 and to also ensure that the ageing functions are current. If a new transaction has been added to the target entity's transaction history since the last assembly, the biographical imagery server 201 assembles the workfile summaries with the new transaction in step 1903 to ensure accuracy and currency.

Various database techniques may be employed to optimize the processing of multivariate aggregate tables such as the assembly summary workfile 507. In step 1904, the biographical imagery server 201 determines whether the contacts view has been selected. If the contacts view is not selected, the process clears the user screen and resets all of the positioning guides to the target format 1907. If the contact view has been selected, the biographical imagery server 201 composes the contact profiles. The contacts view is based on the contact entities' phone transaction histories and only with the target entity. This selective 'view' or 'sorting' of the transactions table 418 is depicted in step 1905. Because there may be many (e.g., more than four) active host entities involved with the target entity, and to establish the order of highest exposure to the target entity, all of the host contacts are processed and the top four active contacts are selected for display 1906 on the user's monitor. Similarly, the top three liaison profiles are processed from amongst the entity's 'operator' contacts within the selected survey range.

Each attribute represented in the target entity's assembly summary workfile 507 may have any number of images representing the scale of value ranges for that attribute. Each image master specifies the layer and may specify a preferred sector where its display asserts the most impact to the completed profile. Each image is thus possibly contending with any number of other images for a primary sector closest to the surface of the display. The positioning of an image is based on which attribute has the highest average value from the aggregate, aged values of the attribute's transactions. Thus, in step 1908, the biographical imagery server 201 arranges the images within a sector group (layer) according to the average values of the corresponding attribute from highest average value to lowest average value.

Because there may be more images (active attributes) than there are available sectors in which to display them, the rendering process arranges the contending images in reverse value order to ensure that the strongest images end up on the top of the available sector groups in their respective layers. For this reason, some images that represent low average value attributes may not appear on the final display. If the biographical imagery server 201 determines in step 1909 that a contacts profile is being rendered, the top two foreground and fascia layers of those host entities' attributes are presented on the display. Thus, in step 1910-1911 the biographical imagery server 201 bypasses the rendering of the background layer 701 and midground layer 702, if any, and proceeds to step 1918 to the foreground and fascia layer rendering.

For 'contacts' displays, the target entity profile is rendered before the contacts entity profiles. For the target entity, the background layer images are processed first. In step 1912, the biographical imagery server 201 selects the top value attributes in the background layer group. Next, in step 1913, an image corresponding to a range value that includes the value of a top attribute is obtained from the images master table 508 for each of the top attributes. Then, in step 1914, the obtained images are scaled to the respective target or contact area size and layered from lowest weight to highest weight within that sector group. Because there are six background sectors in the background layer, each of which overlaps its lower order counterpart, the biographical imagery server 201 displays the six highest value background images from all of the selected top attributes. Since not all attributes necessarily deploy background images, some attributes could have their background images displayed but their foreground images may not achieve a sector placement.

Each tier of the four tier attribute code structure, (e.g., section, group, class, and type) can specify its particular attribute image and weight formula for any transactions posted to its own or its lower tier 'children' attribute codes. If all of the six background display sectors, for example, have not been allocated after processing all attributes at the 'type' level, the system will attempt to fill those sectors with images at the class, group, and section level of the attribute code tiers.

In that way, these 'families' of attributes can contribute to the general background or midground composites of the entity's transaction history. While not all of the images at these higher tiers may be visible behind or beneath the more dominant images, they are nonetheless rendered into the composite image of the entity. This requires that the biographical imagery server 201 aggregate the values at those tier levels for each attribute pending allocation of those display sectors by any attribute in the entity's assembly summary workfile.

This inheritance function repeats at the midground layer but not at the foreground or fascia layers. Because the absence of images in the foreground and fascia layers represents certain factors in an entity profile, higher tier attributes do not display general (parent) images at those layers. Specialized auditing applications may be devised to allow tracing of the respective layers to identify what tiers of what attributes are involved in the final image composition.

The midground layer (e.g., the midground layer 702 of FIG. 7) is processed in steps 1915-1917 in the same manner as the background layer (e.g., the background layer 701 of FIG. 7). For the target profile view, the midground layer provides for six sectors of images based on the highest attribute values. For the contacts view, the top two midground images are rendered. As with the background attributes, if any midground display sectors are unallocated after processing the 'type' tier of the attributes, the lower order code tiers of 'class', 'group', and 'section' are processed to find midground specified images to fill those available sectors. The midground sectors are allocated and displayed in lowest to highest values within the six highest value attributes.

The foreground layer (e.g., the foreground layer 703 of FIG. 7) is processed in steps 1918-1920 in a manner similar to the background and midground layers. The foreground layer is processed for both target entity profiles and for contact view profiles. Ten display sectors are allocated in the foreground layer for the target entity profile. The same prioritization process of the highest ten value attributes is applied to the foreground layer with the lowest value attributes being displayed in the lowest exposure sectors. Because the foreground and fascia layers represent the most distinguishing attributes of the entity profiles, no 'parent' attribute tiers are searched to fill available vacant sectors in the foreground layer.

The fascia layer (e.g., the fascia layer 704 of FIG. 7) is processed in steps 1921-1923. The rendering of the fascia layer is performed for both target entity profiles and for contacts view. This layer is intended to reflect the most distinguishing of the entity attributes, including vector positioned facial expression. As shown in previous FIG. 10, in the contacts view, the left third of the screen is available for the target entity profile. All of the attribute images accrued by the target entity that are directed to the fascia layer are displayed, albeit in reduced size, to fit that area. They are ordered in low to high attribute value. Because of the space truncation, some of the lower order (i.e., rear) sectors images may not be visible in that format.

The contact entities' assembly summary workfiles are limited to a range of phone call attributes (step 1905). Based on their aggregate phone values with the target entity, the top four host contact entities are processed along with the top three liaison entities. These are rendered in lowest attribute value order in order to present the most frequent phone contact in the forefront flanked by the lower value contacts.

FIG. 20 shows the workflow for the assembly method 2000 of the biographical imagery server 201. This process aggregates, ages, weighs, accumulates, and arrays the history of all of the transactions of the target entity into summary records in the assembly summary workfile. The assembly process 2001 is invoked at various processing points in the biographical imagery server 201 application in response to an entity profile request. For a 'target' entity profile, the assembly process analyzes all of the current and consolidated transactions 2003 that have been accumulated for the entity in the transactions table 418 and generates summary records in the assembly summary workfile 507 for each tier of each attribute for which that entity has transactions 2012-2027.

Each attribute code is composed of four tiers—'section', 'group', 'class' and 'type'. These represent the hierarchy of each business's operational structure and are designed by the biographical imagery server 201 engineer and user to reflect the desired imaging details. The transactions at the 'type' tier accumulate value and transaction counts for that tier as well as for its higher (parent) attribute tiers of 'class', 'group', and 'section' 2011. This provides for the rendering of image displays at any and all of those tiers. Scene backgrounds and other conditions can be defined and rendered at those tier levels based on accumulated tier values. The assembly processes all of the entity's transactions 2003 in attribute code order so that it can accumulate and record each tier's summary statistics in the assembly summary workfiles 2012-2027.

Each entity's master record 2007 in the entity master table 416 is updated with the date and time of its last posted transaction and also with its last completed workfile assembly so that the system can detect when a fresh assembly needs to be run. When an assembly is invoked, it uses the current date and time stamp 2002 for retention date checking 2004 as well as for the ageing 2009 and weighting 2010 (see also 502-506) of the entity transactions. While attributes can age on an hourly basis, most inquiries require a daily margin of timing. A user icon for an immediate up-to-the-minute assembly execution is provided.

Before each transaction is weighted, the original value (either count or quantity) is accumulated into either the quantity or count history array in the attribute's workfile summary record 2008. This array allows the user to invoke a twelve period (hour/month/day/year) graph or histogram of the attribute summary.

The ageing and acceleration factors provided in both the attribute master and in the event master allow the user to 'throttle' the impact of any type of transaction so that more urgency or more temperance can be expressed for any event. For example, a delinquent court stipulation value might thus express more importance than delinquent rent value; a water leak or noise complaint requires faster response and image impact than a painting complaint. While the host MIS/accounting system may provide for alerts based on thresholds within its operational systems, the biographical imagery server 201 may react more dynamically to such events through its telephone system 203 integration and be able to issue independent alerts to the known contacts of an entity.

Each attribute named in the event master specifies either a quantity (dollar, yen, franc, etc.) value or a count (integer: units, pounds, ounces, CSF, etc.) value for its transactions. (See database tables in Appendix A). The corresponding weight values are carried in those formats for those attributes. The ageing and acceleration weighting 2010 factors that are copied into each transaction from its attribute master can specify a fixed (positive or negative) or percentage (positive or negative) value (weight) to be added to that transaction's value based on the specified 'n' units of hours, days, months, or years transpired since (aged) or in advance of (accelerated) the transaction date (i.e., a forthcoming expiration or termination date). As such a date approaches, a warning image or animated image can be engaged to alert the user.

The event master also provides its own additional weight factor to be added (positive or negative) to the transaction. Any specific attribute may be applied by many different events and this event weight factor allows any specific event, such as a tenant fire or insured's accident, to add its own measure of weight to that transaction. This fixed amount is added once at the origination of the transaction but is included in the aged or accelerated value computation.

After processing and accumulating all of the transactions for a specific attribute tier 2005, the biographical imagery server 201 processes an assembly summary record at each tier level 2012, 2016, 2020, 2024. At the end of each tier, it optionally averages that value total by dividing it by the total transaction unit counts 2013, 2017, 2021, 2025. It also accesses its corresponding image master from the images master table 508 (2014, 2018, 2022, 2026) based on its absolute or averaged value and records the layer and sector positioning in the assembly summary workfile 507 for later prioritization in the rendering process. With a limited number of sectors in each display layer, the highest value images contend for those sector placements. The images master 'set' for any attribute code can have a range of different images for its anticipated range of values.

For each completed tier 2015, 2019, 2023, 2027, a summary record is posted to the assembly summary workfile 507 for access by the rendering process. At the end of processing the respective summary records for each of the tiers, the next transaction is processed 2028 for that entity. When all of the entity's transactions have been processed 2006, the biographical imagery server 201 updates the entity master's last assembly date & time in the entity master table 416 and is ready for display by the rendering process.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A method of visualizing a nature, size, tenure, and/or status of any of a host company's clientele, vendors, employees, or other business entities or business relationships by instantaneously presenting a multi-dimensional graphical display of a subject business entity profile on a user's display screen, the multi-dimensional graphical display being composed of layers of realistic and/or caricatured images that are prioritized to feature dominant attributes of a plurality of attributes indicative of the business relationship, thereby providing the user, including those with learning handicaps, and whether the subject business entity is familiar or unfamiliar to the user, with a capacity to respond timely and accurately to a current contact or event with the subject business entity, the method comprising:

capturing and aggregating, by an imagery server, event data from a plurality of events as it is received through a plurality of data sources operating within a system of the host company and using hardware and software devices of the host company's phone, automated accounting, email, and messaging systems resources, the event data collectively reflecting a plurality of transactions between the host company and the business entities with whom the host company maintains business relationships;

relating the subject business entity to current and historical transactional details that comprise attribute statistics of the transactions;

interpreting a plurality of data messages from a plurality of events received from the plurality of data sources and associating each data message to one or more attributes of the plurality of attributes;

generating and storing a plurality of uniformly formatted attribute records based on the plurality of transactions, pre-assembling the subject business entity's cumulative activity for an affected attribute's values corresponding to a plurality of transaction records regarding the subject business entity, thereby facilitating conversational response speed of subsequent subject business entity profile assemblies by avoiding a re-computation of current ageing and weighting;

upon passively detecting an inquiry triggering event by the imagery server from the plurality of data sources operating within host system:

assembling cumulative activity of the plurality of attribute values corresponding to the plurality of transaction records regarding the subject business entity;

dynamically prioritizing the plurality of attribute values of the subject business entity based on the plurality of transaction records to which each attribute's specific ageing and weighting algorithms are applied, such algorithms reflecting both accelerated and decelerated adjustments to original values of the plurality of transactions;

transforming, by the imagery server, the plurality of attribute records with current values based on the plurality of aged and weighted transaction records regarding the subject business entity into the multi-dimensional graphical display by:

selecting a plurality of value-scaled images from a plurality of image arrays that correspond to the plurality of attributes and that represent each attribute's weighted value range of visual representations, wherein each of the plurality of value-scaled images corresponds to each attribute's weighted value of the subject entity's cumulative transactional data;

layering the plurality of value-scaled images within specific sectors of an image plane according to location and prioritization parameters defined in each attribute definition;

associating various background and foreground images that relate to types of services or products provided by a host entity to the subject business entity;

superimposing successive transparencies of foreground to background images relative to attribute values of the subject business entity according to a prescribed screen location assignment of images that characterize corresponding attributes; and instantaneously rendering, by the imagery server, a composite image for the multi-dimensional graphical display on the user's display screen upon detection of an initiating inquiry, the multi-dimensional graphical display reflecting highest priority attribute images in such priority order and in such recognizable imagery as to invoke the user's innate comprehension of the nature, size, tenure, and/or status relationship features of the subject business entity in order of prioritized importance thereby enabling any user, whether familiar or unfamiliar with the subject business entity, to instantaneously assess and respond timely and accurately to a current engagement with the subject business entity.

2. The method according to claim 1, further comprising propagating the plurality of images into a plurality of size-scaled images of each image master from a plurality of image masters to correspond to a range of values in each of the plurality of attributes; and arranging the plurality of size-scaled images corresponding to the plurality of attribute values corresponding to plurality of transaction records that have been propagated from the plurality of events regarding the subject business entity previously received from the plurality of data sources operating within the host system.

3. The method according to claim 2, wherein the plurality of images is selected from the group consisting of cartoon images, caricatures, photographs, still images, moving images, animations, and any combination thereof.

4. The method according to claim 1, wherein the steps of claim 1 are performed on an independent server or servers that maintain persistent Transmission Control Protocol/Internet Protocol (TCP/IP) or equivalent communications with the host company's plurality of data sources including the automated accounting, phone, email, and messaging systems resources, passively detecting initiating events regarding the subject business entity from the plurality of data sources, initiating events including Management Information System (MIS) inquiry activities, incoming or outgoing phone calls, incoming and outgoing emails, and/or incoming and outgoing messages, providing instantaneous inquiry display of the subject business entity's profile in response to initiating events without user intervention by deriving and projecting graphical relationship representations to the user's display screen, those resulting visually interpretive graphic representations enabling and, in coordination with host company policies, guiding the user's response.

5. The method according to claim 1, further comprising maintaining connection and dialog with the plurality of data sources including the host system's automated accounting system, Private Branch Exchange (PBX)-based phone system, email system, messaging system, conventional user workstations, or any combination thereof, wherein the aggregating includes:

aggregating statistical traffic data on incoming and outgoing phone calls reposited from the host system's PBX-based phone system in conventionally generated messages reflecting event particulars including initiating and destination entity identifications, the date, time, or duration of each call, and the call's accept, decline, hold, transfer, or other elective dispositions;

aggregating statistical traffic data from the host system's email or Short Message Service (SMS) messaging systems transmitted to the imaging server in conventionally generated messages reflecting event particulars including participating entities, the date, time, and disposition as to the email or message having been read, unread, responded, deleted, or other elective dispositions on incoming and outgoing emails or messages; and aggregating both the statistical traffic data from event messages and quantitative data from event messages received from the host's Management Information System (MIS) accounting and management system with the message contents reflecting event particulars, of host system accounting events, each occurring with its external and internal business entities, wherein the business entities include at least one of clients, customers, vendors, agents, service resources, prospects, or personnel in the host company.

6. The method according to claim 5, wherein the host system is further configured to visually communicate a subject business entity's business relationship with the host company, the host system comprising:

operations systems configured to detect and transmit event information regarding the plurality of events relating to the subject business entity to an imagery system; and a plurality of display screens associated with respective users inquiring the host company, each of the plurality of display screens being dedicated only for use with the imagery system and being configured to display the composite image for the multi-dimensional graphical display representing the profile of the subject business entity, wherein the imagery system includes an imagery server in communication with the host system, the imagery server being configured to:

receive messages from the host system representing data events originating in the accounting, phone, email and messaging system resources and other interactive user sources in those respective host system operations;

detect an inquiry triggering event message from the host system requesting the profile of the subject business entity;

assemble the plurality of attributes corresponding to aggregated information regarding the plurality of events in response to receiving the inquiry message;

select the plurality of images associated with the plurality of attributes from among an inventory of images;

generate the composite image of a plurality of layers of images from the selected plurality of images;

transmit the composite image to a user display screen of the host system;

transmit inquiry requests for specific subject business entities to the host system in concert with incoming and outgoing phone calls; and transmit logfile messages of newly created or unidentified business entities to the host system for validation.

7. The method according to claim 6, wherein the imagery server comprises:

an event code map database storing information regarding a plurality of host accounts and corresponding event codes; and a subject entity master database storing information regarding a plurality of business entities including primary identification information and secondary identification information as maintained in the host system, the secondary identification information including phone, email address, or entity name, wherein the imagery server is configured to:

determine whether the subject business entity in the event information is found among the plurality of subject business entities stored in the subject business entity master database;

add a subject business entity to the subject business entity master database if the subject business entity is not found among the plurality of subject business entities;

using native subject business entity identification information and secondary subject business entity identification information to:

validate a host accounting system account code in the event information against the plurality of accounts stored in the event code map database to obtain an event code; and record changes to the subject business entity identification information in the subject business entity master database from special event messages issued by the host system; and transmit an acknowledgement message to the host system that the subject business entity has been recognized, or that the subject business entity has been temporarily created in the event of an unrecognized entity, and that the event was successfully recorded by the imagery server.

8. The method according to claim 7, further comprising:

reading the host system's unique identification code for the subject business entity from the event message;

searching a subject business entity table for the unique identification code on the imagery server;

generating a new subject business entity record on the imagery server if the unique identification code is not found in the search of the subject business entity table;

generating a message from the imagery server to the host system requesting assignment of a host system's native entity identification to the new subject business entity;

identifying on the imagery server a secondary business entity within a primary business entity;

specifying on the imagery server a name and rank for the primary or secondary business entity; and updating on the imagery server the subject business entity with the native entity identification and secondary entity identification subsequently received from the host system.

9. The method according to claim 7, further comprising:

retaining additional demographic data regarding a hierarchal structure of the subject business entity as defined in the host system for referencing comparable business entities within region, area, community, building, unit, or lease groups;

providing special event message formats for updating of primary entity master data including specifying a demographic location hierarchy of region, area, community, building, unit, and lease keys;

providing special event message formats for fulfilling primary and secondary entity master data including specifying name and rank;

providing special event message formats for fulfilling primary and secondary entity master data including phone contact information;

retaining the phone contact information to subsequently associate phone record events for a new entity; and supplying the host system with a message relating a presence of an unidentified phone contact for allowing the host system to identify the unidentified phone contact or to assign a new entity master for the unidentified phone contact.

10. The method according to claim 7, further comprising:

tracking phone calls between initiating and receiving entities by using unique entity rank and sequence identifiers within a primary entity master code to graphically inform a user of a relative position of a caller within the caller's organization; and associating a proxy phone identification of a subordinate to a superior entity's phone identification to allow for proxy events.

11. The method according to claim 7, further comprising allowing the user to select and redirect calls to most well acquainted personnel of the company, such redirection being governed by communication with the PBX-based phone system as to current availability of parties to receive the call.

12. The method according to claim 7, further comprising providing the user with go-back navigation capability to step through recent profile sessions, whether by phone call or host inquiry, and applying call back and/or exception and/or disposition updates to those sessions.

13. The method according to claim 5, further comprising:
installing Application Programming Interface (API) functions on the host system that are compatible with MIS operations in order to generate event messages for activities within accounting processes that reflect quantitative accounting activities, including entity inquiry, for accounting system entities;
invoking the API functions on the host system to generate event messages describing the accounting activities and including native entity identification codes, date and time of an activity, and account classifications as defined in an imagery system event map;
sending the event messages from the host system to the imagery system; and
receiving at the host system accepted and rejected event messages.

14. The method according to claim 5, further comprising:
maintaining persistent real-time communication between the imagery server and the host's PBX-based phone system via Transmission Control Protocol/Internet Protocol (TCP/IP) or other communication protocol for receiving and sending Call Data Record (CDR) and/or Station Message Detail Recording (SMDR) data messages from or to the host system's PBX-based phone system on a server indicating communication traffic with various identified and unidentified subject business entities;
maintaining multiple call session dialogs with a PBX-based phone system on a real-time basis for the initiation, answer, decline, termination, transfer, hold, or other call directive functions between the PBX-based phone system and the imagery server;
receiving CDR and SMDR formatted messages at the imaging server from the host's PBX-based phone system in notification of new and existing call activities, such call activities to be associated with an identified or unidentified entity in the host system for initiating and managing an inquiry in the imaging server;
sending CDR and SDMR formatted messages from the imaging server to the host's PBX-based phone system to manage existing calls and to initiate new calls associated with inquiry actions on the subject entities;
managing users' phone sessions and real-time phone activities to allow for interruption and redirection of active calls based on attribute prioritization rules;
providing interactive call accept or decline options on the user's display screen;
initiating or terminating imagery system inquiry events for the identified subject entity with immediate display of an affected entity's profile on the user's display screen,
wherein identifying includes creating data entities for unidentified incoming or outgoing phone call numbers, emails, or messages that are not associated to known subject entities;
recording the frequency and connection ratio of specific external contacts to specific internal extension numbers so as to allow the host system to suggest most common routing of an identified external contact to the internal extension numbers;
recording the frequency and connection ratio of specific internal host extensions to specific external contacts so as to further allow the host system to suggest the most common routing of the identified external contact to the internal extension numbers; and
displaying scaled graphical images within rendered entity profiles in proportional size to each of an internal contact entity's graphical representations, the internal contact entity's graphical representations further depicting the weighted, cumulative dispositions of contact histories, the dispositions being color coded as to favorable, neutral, or unfavorable.

15. The method according to claim 1, wherein aggregating the event data includes:
determining a plurality of event codes for the host system's native activity codes and/or chart of account codes defined in the event data;
searching an event master table for at least one attribute associated with each of the plurality of event codes; and
assigning an event code for invalid host activity codes, if any, in an event map and generating a log message to the host system for any invalid host activity codes.

16. The method according to claim 15, wherein aggregating the event data further includes:
recording a transaction for at least one of the plurality of attributes from each of the plurality of events to obtain a plurality of transactions;
invoking one or more specific attribute references as defined for each event;
generating a transaction record for each defined attribute, including copying of current ageing and weighting rules and other properties for that attribute; and
propagating parent attributes, if any, into the generated transactions for higher tier image display in a subsequent scene of images with the parent attributes.

17. The method according to claim 1, wherein aggregating the event data regarding the plurality of events further includes updating a latest transaction date and time in an entity table control record to invoke recalculation of a subject business entity's assembly summary workfile upon inquiry as to whether the assembly summary workfile is or is not current.

18. The method according to claim 1, wherein assembling a statistical workfile includes:
determining the age of each transaction;
comparing the age of each transaction to a retention date;
bypassing a transaction if the age of the transaction is earlier than the retention date;
accumulating values of aggregated transactions of the subject business entity by attribute code;
accumulating a number of transactions for each attribute code; and
recording oldest and newest transaction dates within the attribute range to an assembly summary workfile record of the respective attribute code.

19. The method according to claim 18, wherein building a statistical workfile includes:

using count or quantity values as provided in an attribute master definition to reflect decimal or whole values;

adjusting current count or quantity values for the transaction by static weight and count factors to reflect exaggeration as provided in the attribute master definition and an event master definition;

comparing transaction date to an ageing threshold;

computing positive or negative ageing factors based on flat amounts or based on a percentage of an original count value or an original quantity value of the transaction;

adding positive or negative ageing factors to the original count value or the original quantity value of the transaction based on a comparison of the transaction date to the ageing threshold;

comparing the transaction's date to an acceleration threshold;

adding positive or negative acceleration factors to the original count value or the original quantity value based on a comparison of the acceleration threshold to the transaction date;

accumulating the adjusted count and quantity values from current and consolidated transactions for each attribute code;

averaging the accumulated count or quantity values of all transactions for each attribute code based on unit transaction counts from current and consolidated transactions as elected by an averaging option;

reading an associated image master in an images table based on a total accumulated and adjusted summary total of each respective attribute in the statistical work file;

copying an image master identification (ID) code, layer, sector, or other display positioning settings for a selected image into a statistical work file summary for each respective attribute to provide display sector priority; and recording computed average and transaction counts and other computed statistics to an assembly summary workfile record of the respective attribute code.

20. The method according to claim 18, wherein aggregating the event data includes:

pre-assembling historical and current data in advance of receiving inquiry messages to minimize recent transaction update processing and image rendering time upon inquiry of the subject business entity;

updating only assembly summary workfile attribute records that have recently recorded transactions for up-to-the-moment accuracy of those attribute values and image selections, the recently recorded transactions being identified by date/time stamps compared to a last pre-processing date/time stamp in the subject entity master and in each attribute's assembly summary workfile record; and performing the pre-assembly at the moment of collection of each transaction for any currently affected attribute, the determination including an application of that attribute's specific ageing and weighting algorithms, which are formulated to reflect both accelerated and decelerated adjustments to original values of such transactions as determined to be needed at posting time of an impacting transaction, the pre-assembly including posting of a current time stamp and the next-scheduled ageing and weighting time to the attribute workfile record as prescribed by an attribute's algorithm, the pre-assembly thus facilitating the speed of subsequent profile assemblies by avoiding a re-computation of current ageing and weighting if executed before the next-scheduled ageing and weighting time limit as maintained in the subject entity master and in the respective assembly summary workfile attribute records.

21. The method according to claim 1, wherein generating the composite image for the multi-dimensional graphical display includes:

composing predominant facial expressions based on vector location within a fascia tier as directed from various contending attributes to properly reflect current transactional events;

composing statistically derived rating scales depicting the subject business entity's relationship to all or specific other business entities within defined demographic ranges or attribute classes;

applying military-type insignia to composite profiles of subject business entities to reflect rank, tenure, or experience; and applying shading or coloring to intensify or dilute relationship factors.

22. The method according to claim 21, wherein generating the composite image for the multi-dimensional graphical display further includes:

determining top attributes in total weighted order allowed within each tier of the image plane;

ordering the top attributes in lightest value to heaviest value within a range of display sectors per tier to assert a most dominant attribute on topmost layers of a respective tier;

scaling and contrast grading each of the layers based on specified width and height;

selecting respective layer images based on an aggregated attribute value falling with a high and low range of the image set; and positioning selected images based on vector or fixed background, midground, foreground, and fascia sector address within the image plane.

23. The method according to claim 1, further comprising:

posting a disposition reflecting a user's determination of a favorable or unfavorable conclusion to a current contact with the subject business entity, including successive menus of images depicting various ranges of demeanor that the user may click to or point at on the screen that results in the generation of an additional transaction record noting that conclusion, further memorializing a specific history of activity with the subject business entity;

displaying of the plurality of displays a user interface allowing for an entry by a user of a determined disposition of the current contact related to the subject business entity;

generating or updating an event message for a current inquiry event to include a specific type and details of a chosen disposition; and processing the generated event message into a standard transaction record to accrete that exception into the subject business entity's history on the imagery server.

24. The method according to claim 1, further comprising:

providing a user's option to post a record of the subject business entity's exceptional behavior or demeanor during a contact episode so that subsequent immediate or delayed contacts with the subject business entity are made aware of a current temperament of the contact episode and a general demeanor of the subject business entity with a most recent series of contacts, such exceptions being reflected in a sequence of user selected images and temperature type scale setting by the user indicating a measure of that demeanor or behavior as mild to severe;

displaying a user interface including icon-based or image-based menus to record an exception occurrence or condition regarding the subject business entity;

displaying sub-menus of icons or images associated with the exception occurrence or condition regarding the subject business entity;

providing a user control in the user interface for scaling a selected action icon or image to indicate a minimum or maximum rating of the exception occurrence or condition;

generating a prescribed event message for a specific type and details of a chosen exception; and processing the generated event message into a standard transaction record to accrete that exception into the subject business entity's history on the imagery server.

* * * * *